US009842706B2

(12) United States Patent
Yoo et al.

(10) Patent No.: US 9,842,706 B2
(45) Date of Patent: Dec. 12, 2017

(54) SEALING MATERIAL USED AS A FLEXIBLE THIN-FILM TYPE SUPER-CAPACITOR DEVICE

(71) Applicant: KOREA INSTITUTE OF ENERGY RESEARCH, Daejeon (KR)

(72) Inventors: Jung-Joon Yoo, Daejeon (KR); Jong-Huy Kim, Daejeon (KR); Jae-Kook Yoon, Daejeon (KR); Hana Yoon, Daejeon (KR); Yong-Il Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 16 days.

(21) Appl. No.: 15/158,764

(22) Filed: May 19, 2016

(65) Prior Publication Data
US 2016/0336120 A1    Nov. 17, 2016

Related U.S. Application Data

(62) Division of application No. 14/602,443, filed on Jan. 22, 2015, now Pat. No. 9,520,243.

(30) Foreign Application Priority Data

Feb. 17, 2014  (KR) .................. 10-2014-0017868
Sep. 30, 2014  (KR) .................. 10-2014-0131302

(51) Int. Cl.
  *H01L 29/08*    (2006.01)
  *H01G 11/68*    (2013.01)
  (Continued)

(52) U.S. Cl.
  CPC ............... *H01G 11/68* (2013.01); *C09J 5/06* (2013.01); *C09J 123/02* (2013.01); *C09J 131/04* (2013.01);
  (Continued)

(58) Field of Classification Search
  CPC .................................. H01G 11/68; C09J 5/06
  See application file for complete search history.

(56) References Cited

U.S. PATENT DOCUMENTS

| 2011/0110020 A1* | 5/2011 | Lin ................. H01G 9/038 361/502 |
| 2011/0116211 A1* | 5/2011 | Watanabe .............. H01G 9/016 361/502 |

(Continued)

FOREIGN PATENT DOCUMENTS

| JP | 2009-158440 | 7/2009 |
| JP | 2014-49635  | 3/2014 |

(Continued)

OTHER PUBLICATIONS

Maher El-Kady et al., "Laser Scribing of High-Performance and Flexible Graphene-Based Electrochemical Capacitors"; Science, vol. 335, Mar. 16, 2012; pp. 1326-1330.

*Primary Examiner* — Caleb Henry
(74) *Attorney, Agent, or Firm* — Kile Park Reed & Houtteman PLLC

(57) ABSTRACT

Disclosed are a method of manufacturing a flexible thin-film type super-capacitor device and a super-capacitor device manufactured by the same. The flexible thin-film type super-capacitor device comprises a base film which has flexibility; a separator which is interposed between the base films; and an active material which is formed on the base film. Thus, flexibility is given since thickness is very thin while maintaining high electrical conductivity and high binding property. In addition, economic feasibility is high and mass production is possible. Further, it is possible to stably and efficiently contain a highly corrosive material.

7 Claims, 45 Drawing Sheets

(51) Int. Cl.
    *H01G 11/84*     (2013.01)
    *H01G 11/56*     (2013.01)
    *H01G 11/58*     (2013.01)
    *H01G 11/52*     (2013.01)
    *C09J 123/02*     (2006.01)
    *C09J 5/06*     (2006.01)
    *C09J 131/04*     (2006.01)
    *H01G 11/32*     (2013.01)

(52) U.S. Cl.
    CPC ............ *H01G 11/32* (2013.01); *H01G 11/52* (2013.01); *H01G 11/56* (2013.01); *H01G 11/58* (2013.01); *H01G 11/84* (2013.01); *C09J 2203/326* (2013.01); *C09J 2423/00* (2013.01); *C09J 2431/00* (2013.01); *Y10T 428/24752* (2015.01); *Y10T 428/24843* (2015.01)

(56) References Cited

U.S. PATENT DOCUMENTS

2013/0019947 A1*  1/2013  Ejima .................. H01G 9/2077
    136/259
2015/0235778 A1*  8/2015  Yoo ........................ H01G 11/68
    361/502

FOREIGN PATENT DOCUMENTS

| KR | 20-2000-0016027 | 8/2000 |
| KR | 10-2013-0044676 | 5/2013 |
| KR | 10-2013-0060969 | 6/2013 |

\* cited by examiner

FIG. 2A

| room temperature 25℃ After 40hr | | Film type | | | | | |
|---|---|---|---|---|---|---|---|
| | | ①PC(50μm) | ②Silicone(100μm) | ③PMMA(50μm) | ④PEN(50μm) | ⑤PPS(16μm) | ⑥PET(50μm) |
| solution | 6M KOH | OK | Damaged | OK | OK | OK | Damaged |
| | 50%(v/v) H$_2$SO$_4$ | OK | Damaged | Damaged | OK | OK | OK |
| | 70%(v/v) H$_2$SO$_4$ | OK | Damaged | Damaged | OK | OK | OK |

| 70℃ After 12hr | | Film type | | | | | |
|---|---|---|---|---|---|---|---|
| | | ①PC(50μm) | ②Silicone(100μm) | ③PMMA(50μm) | ④PEN(50μm) | ⑤PPS(16μm) | ⑥PET(50μm) |
| solution | 6M KOH | Damaged | Damaged | Damaged | Damaged | OK | Damaged |
| | 50%(v/v) H$_2$SO$_4$ | OK | Damaged | Damaged | OK | OK | OK |
| | 70%(v/v) H$_2$SO$_4$ | OK | Damaged | Damaged | OK | OK | OK |

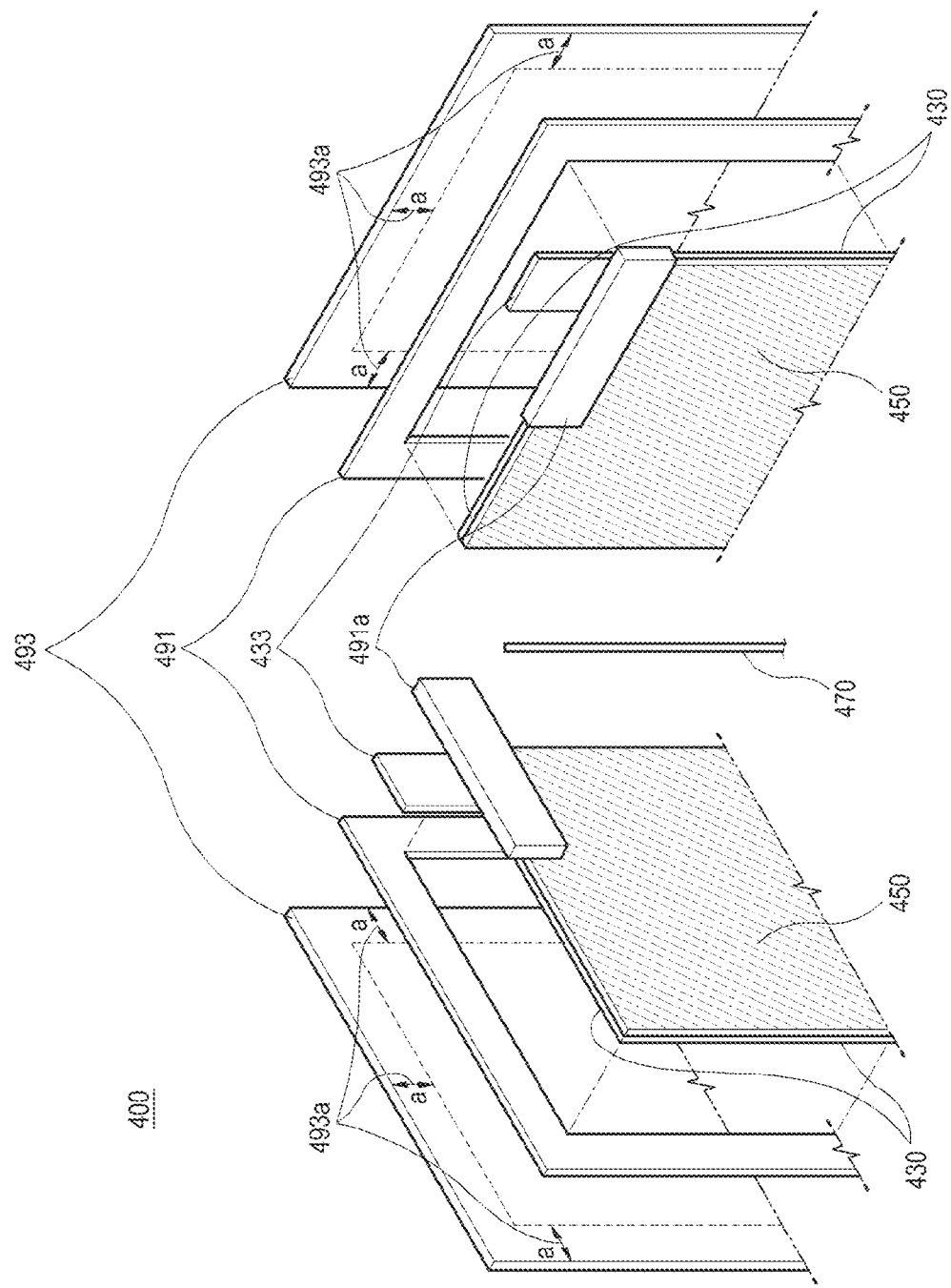

FIG. 15

| hot-melt adhesives | KOH suitability | thickness | Tm(°C) | temperature(°C) |
|---|---|---|---|---|
| EVA | ○ (20, 70°C suitable) | 20 ~ 150 | 85 ~ 90 | 125 ~ 135 |
| Polyolefin | ○ (20, 70°C suitable) | 20 ~ 150 | 105 ~ 110 | 135 ~ 145 |
| Paraffin film | ○ (20, 70°C suitable) | 127 | ~ 60 | ~ 100 |
| Polyacryl | X (decomposed at room temperature) | 20 ~ 150 | 90 ~ 95 | 130 ~ 140 |
| Polyester | X (decomposed at room temperature) | 20 ~ 150 | 105 ~ 110 | 105 ~ 110 |
| Polyurethane | X (decomposed at room temperature) | 30 ~ 300 | 115 ~ 120 | 140 ~ 150 |
| Polyamide | △ (stable at room temperature, decomposed at 40°C or higher) | - | ~ 200 | ~ 200 |
| Styrene | △ (stable at room temperature, unstable at 40°C or higher) | - | 140 ~ 160 | 150 ~ 170 |

SEALING MATERIAL USED AS A FLEXIBLE THIN-FILM TYPE SUPER-CAPACITOR DEVICE

CROSS-REFERENCE TO RELATED APPLICATION

This application is a divisional application of U.S. patent application Ser. No. 14/602,443, filed on Jan. 22, 2015 (currently pending), the disclosure of which is herein incorporated by reference in its entirety. The U.S. patent application Ser. No. 14/602,443 claims priority to Korean Application No. 10-2014-0017868 filed on Feb. 17, 2014, and Korean Application No. 10-2014-0131302 filed on Sep. 30, 2014, the entire contents of which are incorporated herein by reference.

BACKGROUND

Field

The present invention relates to a sealing material, a method of manufacturing a flexible thin-film type super-capacitor device using the same, and a super-capacitor device manufactured by the method, and more particularly to a sealing material, a method of manufacturing a flexible thin-film type super-capacitor device using the same, and a super-capacitor device manufactured by the method, in which a current collector very excellent in binding strength is formed on a flexible base film and an electrode with an active material is provided on the current collector, thereby generally having flexibility and maintaining excellent performance.

Related Art

Like an electrode of a condenser, an electrode of a secondary cell, an electrochemical capacitor, etc. generally includes an active material for causing an electrochemical reaction and a current collector for transferring electrons generated from the active material to an external circuit. The current collector may have high electrical conductivity with the minimum resistance so as not to resist flow of electrons supplied from the active material. Further, the current collector has to have a contact interface as large as possible since the electrons are transferred through a contact interface with the active material, and have a structure where the contacting active material is not easily delaminated thereby having a long lifespan so that mechanical and electrical characteristics can be maintained even though it is repetitively charged and discharged for a long time.

In general, the currently used electrodes of the secondary cell and the electrochemical capacitor are manufactured by applying slurry mixed with the active material, a conductive material, a bonding agent or a binder to the electrochemically-etched aluminum-thin current collector, and then drying and pressing the current collector.

Further, a foldable or wearable electronic device has recently appeared, and thus needs for a flexible capacitor device have been increased.

In this regard, the related arts have been disclosed in Japanese Patent Publications No. 2000-357631 (Dec. 26, 2000) and No. 2010-098109 (Apr. 30, 2010).

However, these methods may cause cavity since an inside of a pit formed by etching is not completely filled, increase the resistance of the electrode due to the employed bonding agent, result in delaminating an electrode active material layer off as time goes on, and show the marked lack of flexibility.

SUMMARY

Accordingly, the present invention is conceived to solve the foregoing problems, and an aspect of the present invention is to provide a sealing material which is very thin to have flexibility while maintaining high electrical conductivity and high binding property, a method of manufacturing a flexible thin-film type super-capacitor device using the same, and a super-capacitor device manufactured by the method.

Another aspect of the present invention is to provide a sealing material which is economical and of which mass production is possible, a method of manufacturing a flexible thin-film type super-capacitor device using the same, and a super-capacitor device manufactured by the method.

In accordance with an embodiment of the present invention, a capacitor device comprises: a base film which has flexibility; a separator which is interposed between the base films; and an active material which is formed on the base film.

The active material may be formed by coating a current collector with a graphene oxide solution, and making the coated current collector be heated, exposed to light and thermally treated, and may comprise one of a carbon material, a carbon hybrid material, metal oxide, nitride, sulfide and conductive polymer.

The base film may comprise a polyphenylene sulfide (PPS) film, a polypropylene (PP) film, a polyethylene phthalate (PET) film, a polycarbonate (PC) film, a polyethylene naphthalate (PEN) film, a polyethylene terephthalate (PET) film and a film on which metal comprising aluminum is deposited.

The base film may undergo surface treatment.

The capacitor device may further comprise a current collector formed on each base film between the base film and the separator, wherein the current collector comprises metal plated on a treated surface of the base film.

The metal may comprise one selected from a group consisting of nickel (Ni), platinum (Pt), silver (Ag), gold (Au), copper (Cu), aluminum (Al), palladium (Pd) and iridium (Ir).

The capacitor device may further comprise an electrolyte to be infiltrated into the active material, wherein the electrolyte comprises an aqueous electrolyte or a non-aqueous (organic or ionic liquid) electrolyte, and is provided in liquid, gel or solid state.

The current collector may be formed by depositing a electric conductor comprising metal or carbon through one or a plurality of methods selected among a plating method, a vacuum deposition method, a screen printing method and a stamping method, or comprises a conductive film comprising metal foil or a conductive composite.

The capacitor device may further comprise: a hot-melt adhesive film which surrounds the base film; and an adhesive which adheres the hot-melt adhesive films to each other, the adhesive comprising one of acrylate, silicone, epoxy and a hot-melt adhesive.

The separator may comprise a polyethylene (PE) or polypropylene (PP) series film, non-woven fabric, and a separator integrated with an electrolyte.

In accordance with an embodiment of the present invention, a capacitor device comprises: a base film which has flexibility; a separator which is interposed between the base films; an active material which is formed on the base film; and a hot-melt adhesive film which seal up around the base film so as to maintain air-tightness of an electrolyte provided between the active materials.

The capacitor device may further comprise reinforcing materials coupled to the backs of the hot-melt adhesive films and thermally adhered to each other.

The electrolyte may be highly corrosive, and the hot-melt adhesive film may comprise a plastic paraffin film and a polyolefin film.

The hot-melt adhesive film and the reinforcing material may be adhered by one or a plurality of methods selected among a method of using an adhesive, a thermal adhesion method, a thermal fusion method and a welding method.

In accordance with an embodiment of the present invention, a method of manufacturing a capacitor device comprises: preparing a base film that has flexibility; forming an active material on the base film; and coupling the base films comprising the active materials with a separator therebetween so that the active materials can face each other.

The base film may comprise a polyphenylene sulfide (PPS) film, a polypropylene (PP) film, a polyethylene phthalate (PET) film, a polycarbonate (PC) film, polyethylene naphthalate (PEN) film, a polyethylene terephthalate (PET) film and a film on which metal comprising aluminum is deposited, and the base film may undergo surface treatment.

The active material may formed by coating a current collector with a graphene oxide solution, and making the coated current collector be heated, exposed to light and thermally treated, and may comprise one of a carbon material, a carbon hybrid material, metaloxide, nitride, sulfide and conductive polymer.

The method may further comprise: forming a current collector on each base film between the base film and the separator, wherein the current collector is formed by plating, and the plating comprises electroless plating or electric plating, and wherein the plating solution comprises one selected from a group consisting of nickel (Ni), platinum (Pt), silver (Ag), gold (Au), copper (Cu), aluminum (Al), palladium (Pd) and iridium (Ir).

The forming the active material may comprise using graphene oxide, wherein the active material is generated by making slurry of graphene oxide be heated, exposed to light and thermally treated.

In the forming the current collector, the base film may comprise a polyphenylene sulfide (PPS) film, and a surface of the base film to be plated may be made rough, sensitized, activated, put into electroless nickel plating solution and then plated.

In the forming the current collector, the base film may comprise a polypropylene (PP) film, and a surface of the base film to be plated is etched, catalyst particles are etched to the surface of the base film and activated, and nickel plating is performed.

The method may further comprise: performing vacuum-impregnation so that the electrolyte can be infiltrated into the active materials, after the base films are coupled to each other.

In accordance with an embodiment of the present invention, a method of manufacturing a capacitor device, comprises: preparing a base film that has flexibility; forming a current collector on the base film; forming an active material with graphene oxide on the current collector; coupling the base films comprising the current collectors and the active materials with a separator therebetween so that the active materials can face each other; and coupling the hot-melt adhesive film for sealing up around the base film to maintain air-tightness of an electrolyte provided between the active materials.

The method may further comprise reinforcing materials coupled to the backs of the hot-melt adhesive films and thermally adhered to each other.

The electrolyte may be highly corrosive, and the hot-melt adhesive film may comprise a plastic paraffin film and a polyolefin film.

The hot-melt adhesive film and the reinforcing material may be adhered by one or a plurality of methods selected among a method of using an adhesive, a thermal adhesion method, a thermal fusion method and a welding method.

In accordance with an embodiment of the present invention, a sealing material comprise: a base member which comprises sealing portions as a region for forming a space to accommodate a material therein and containing and sealing up the accommodated material; a hot-melt adhesive which is coupled to one of the sealing portions; and a sealing means which seals up the sealing portion in a state that the hot-melt adhesive is coupled to the sealing portion, wherein the material of the hot-melt adhesive comprises paraffin, polyolefin or ethylene vinyl acetate (EVA).

BRIEF DESCRIPTION OF THE DRAWINGS

The above and/or other aspects will become apparent and more readily appreciated from the following description of exemplary embodiments, taken in conjunction with the accompanying drawings, in which:

FIGS. 2A and 2B are a table and a picture showing a result of a chemical stability test according to various embodiments of a base film;

FIGS. 14A and 14b are an exploded perspective view and a sectional view for explaining an embodiment of a sealing material forming a capacitor device;

FIG. 15 is a comparative table showing the kind and characteristic of a hot-melt adhesive;

DETAILED DESCRIPTION OF EXEMPLARY EMBODIMENTS

Below, a method of manufacturing a flexible thin-film type super-capacitor device and the super-capacitor device manufactured by the same will be described in detail FIGS. 1A to 17B.

Figure 1A:
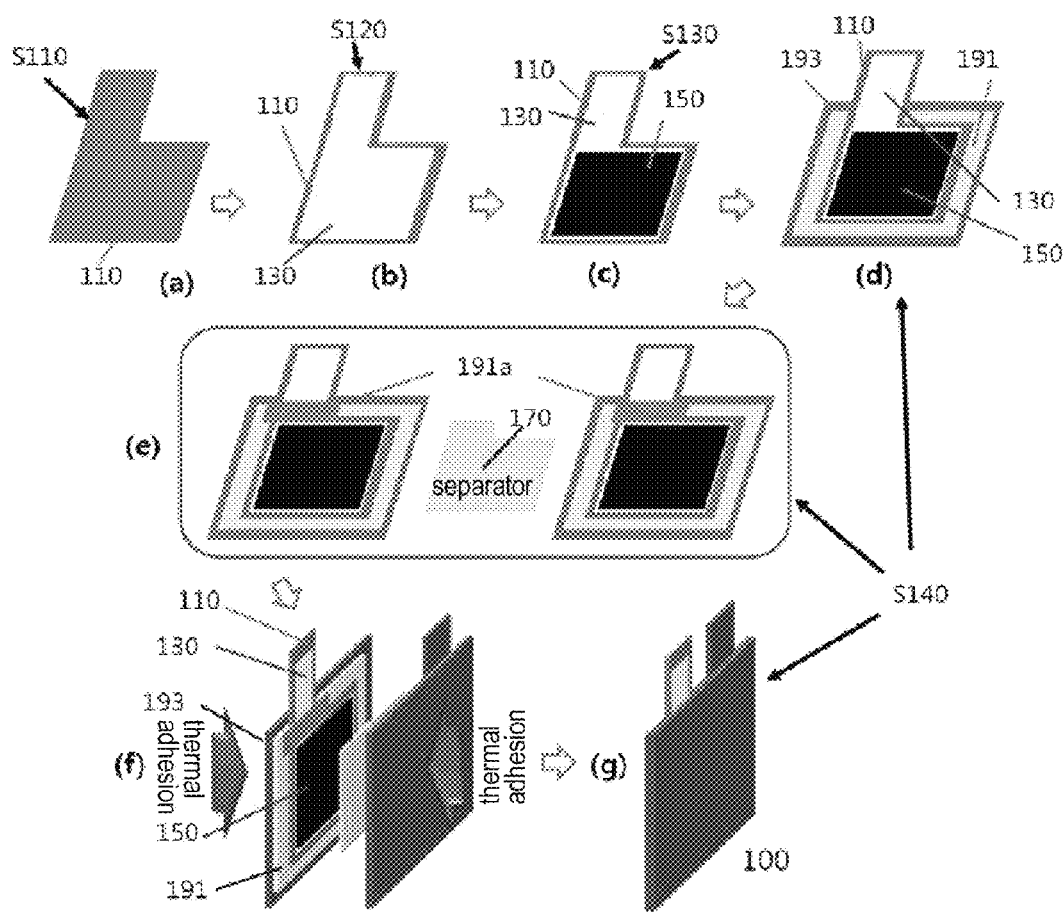
FIGS. 1A and 1B are views for explaining a manufacturing method according to an embodiment and another embodiment of the present invention.
Figure 1B:
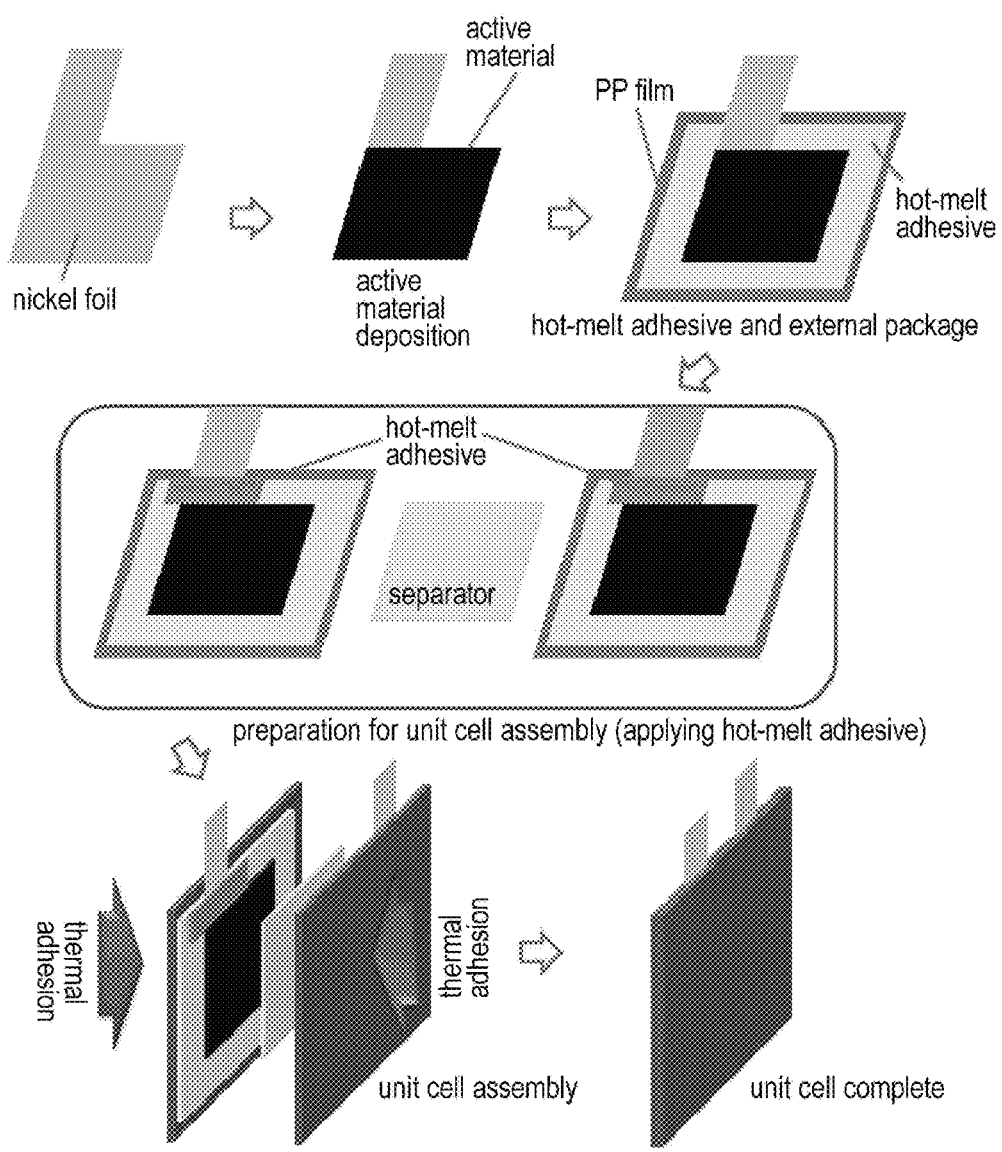
Figure 2B:
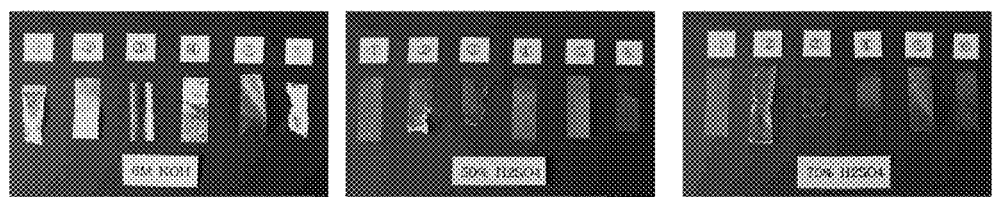
Figure 2C:
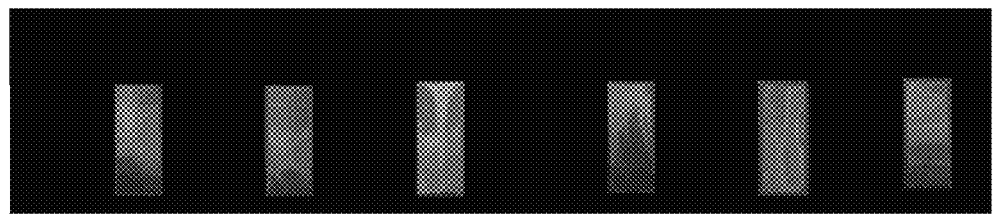
FIG. 2C is a picture showing a result of a chemical stability test when the base film is a PP film.
Figure 3:
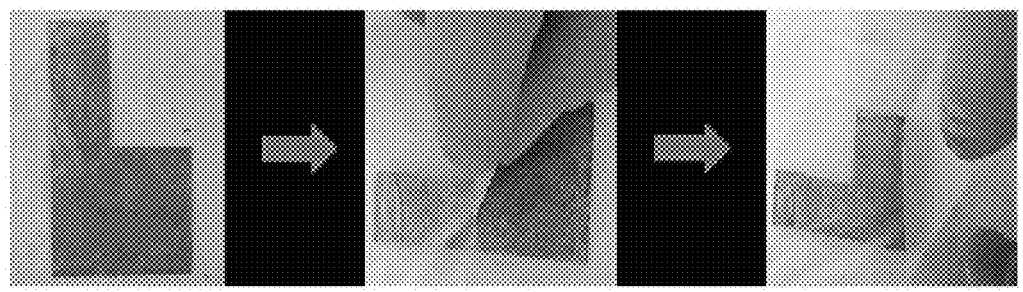
FIG. 3 is a picture showing a test for binding property of a current collector formed by plating when the base film is a PPS film.
Figure 4A:
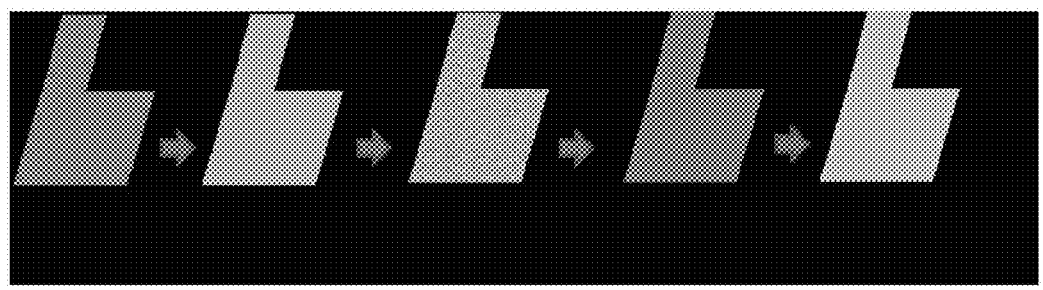
FIGS. 4A and 4B are a schematic view for explaining pretreatment and a process of forming the current collector when the base film is a PP film, and a picture showing a test for binding property of a plated current collector.
Figure 4B:
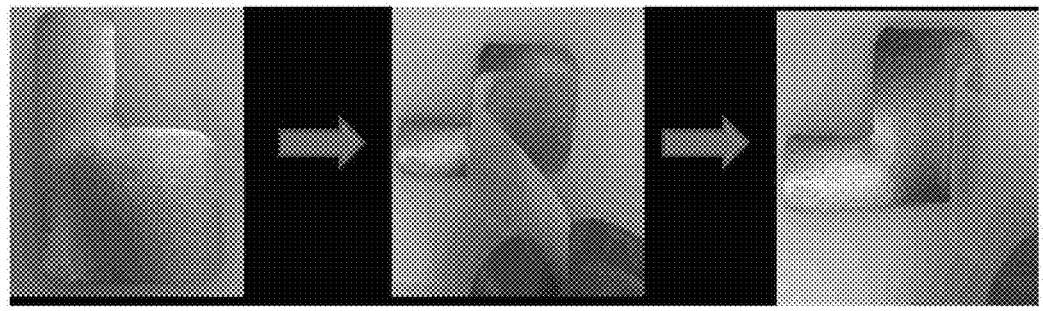
Figure 5:
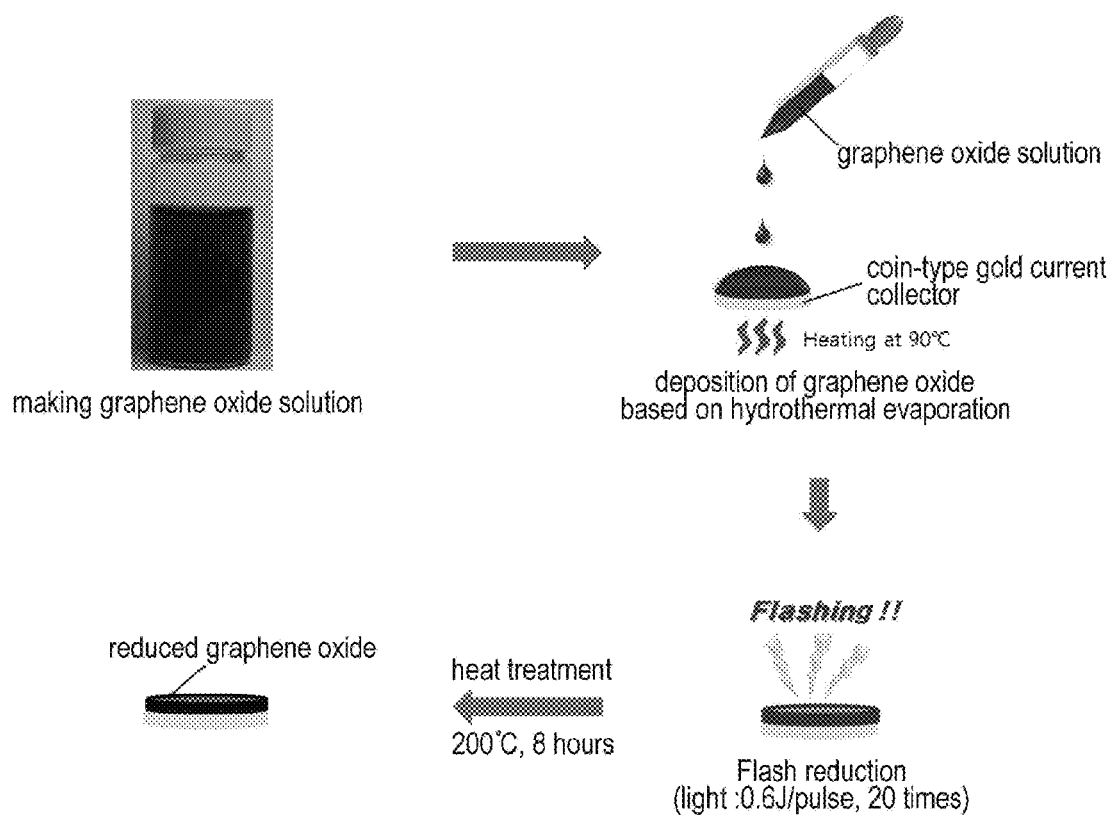
FIG. 5 is a schematic view for explaining a process of forming an active material.
Figure 6A:
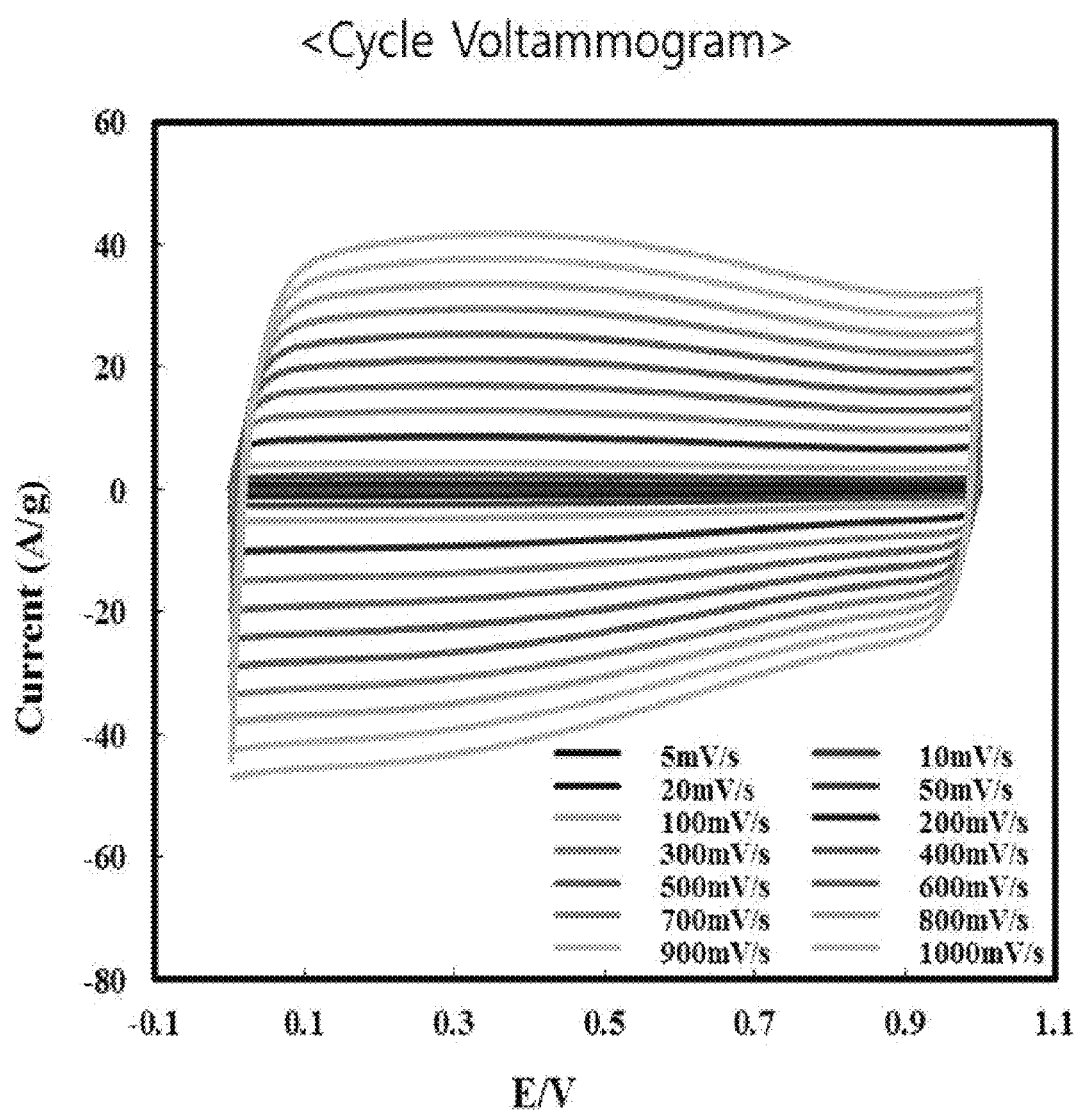
FIGS. 6A to 6D are graphs showing electrochemical characteristics according to an embodiment of the present invention.
Figure 6B:
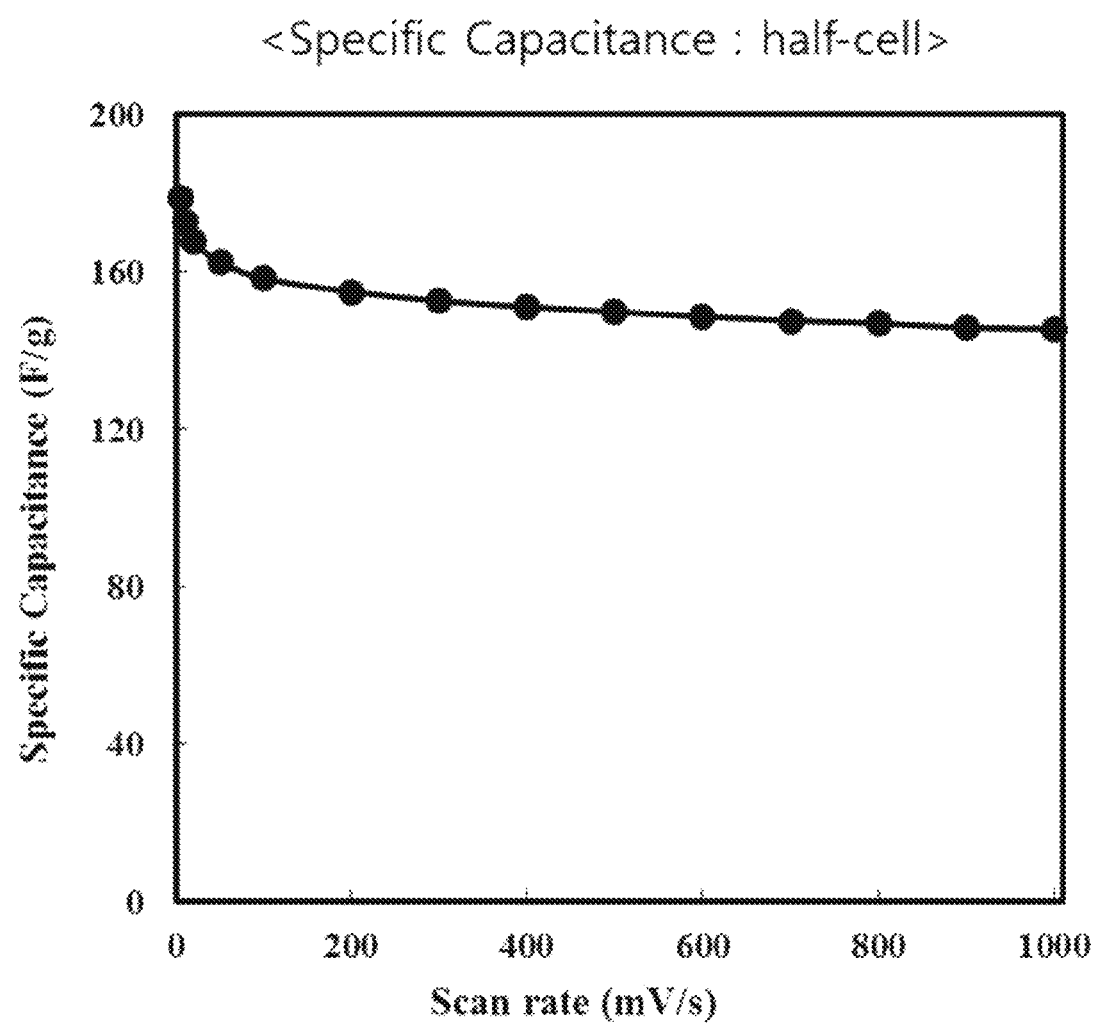
Figure 6C:
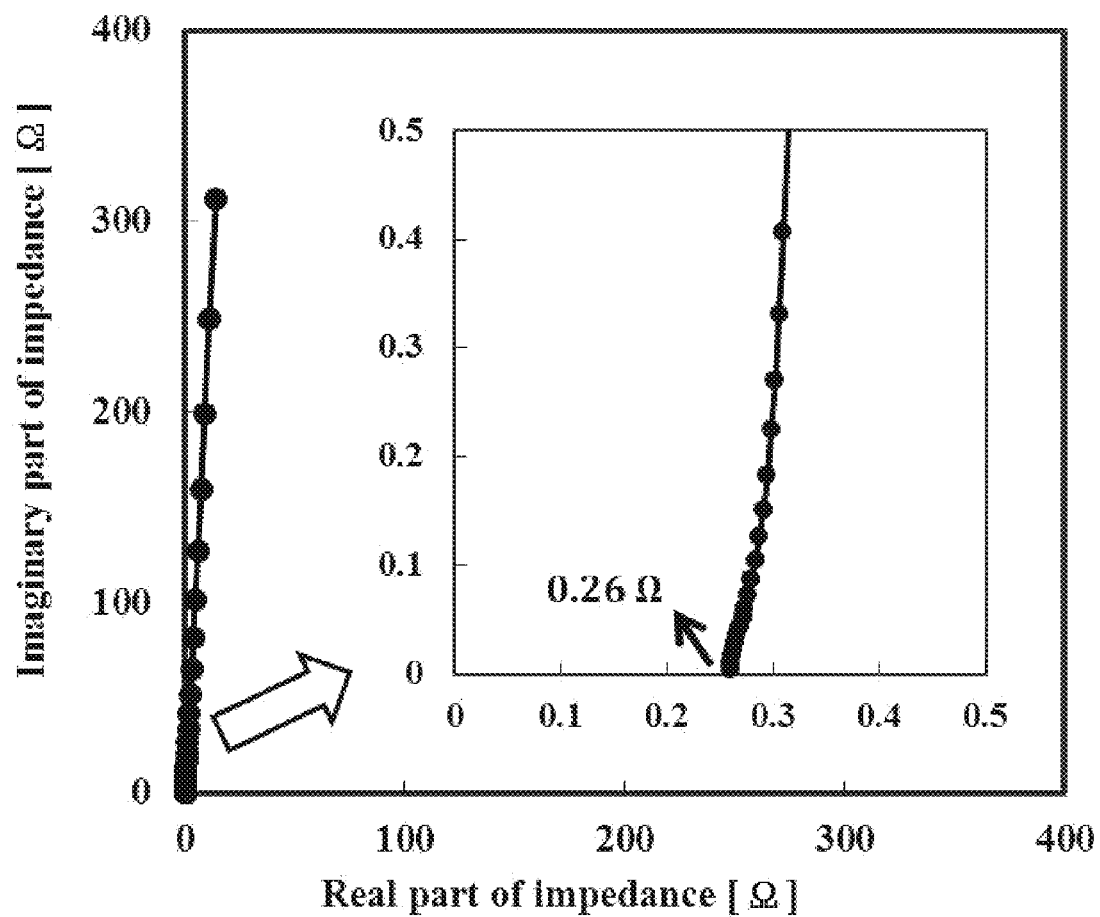
Figure 6D:
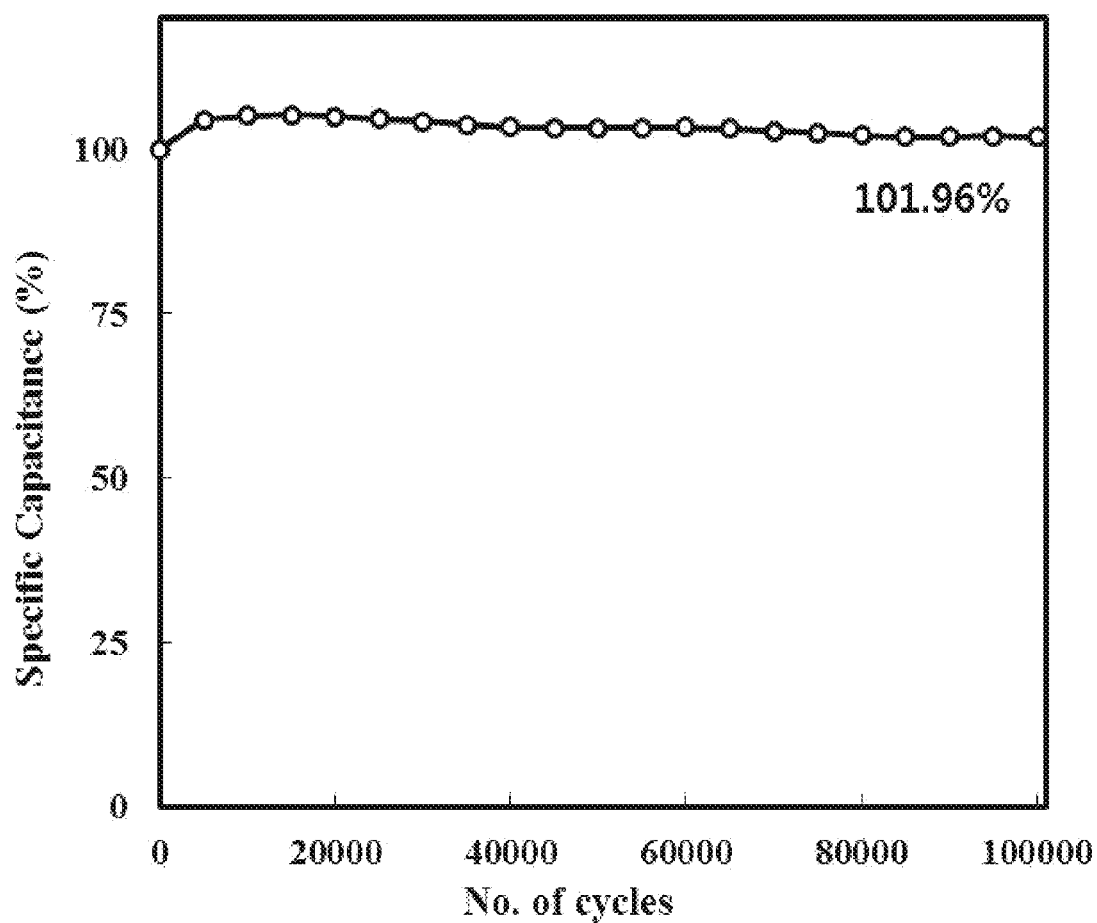
Figure 14B:
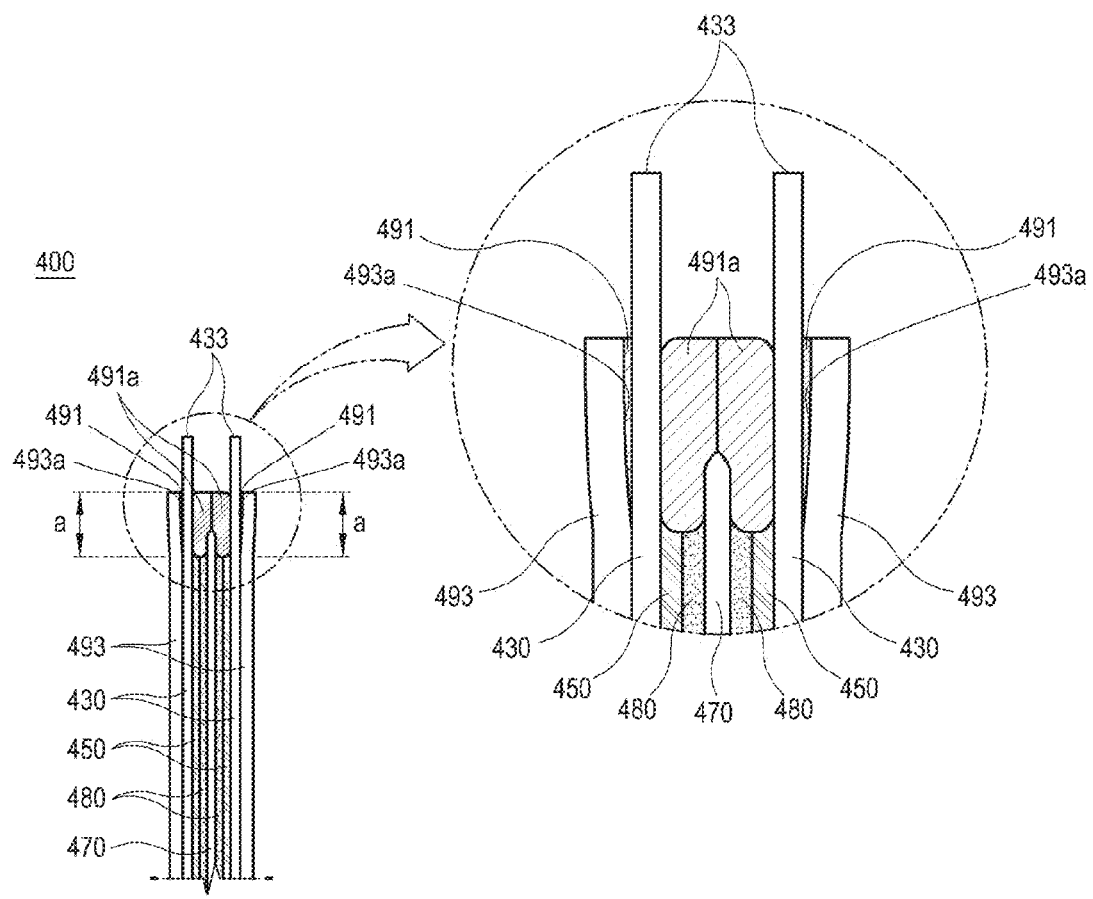
Figure 16A:
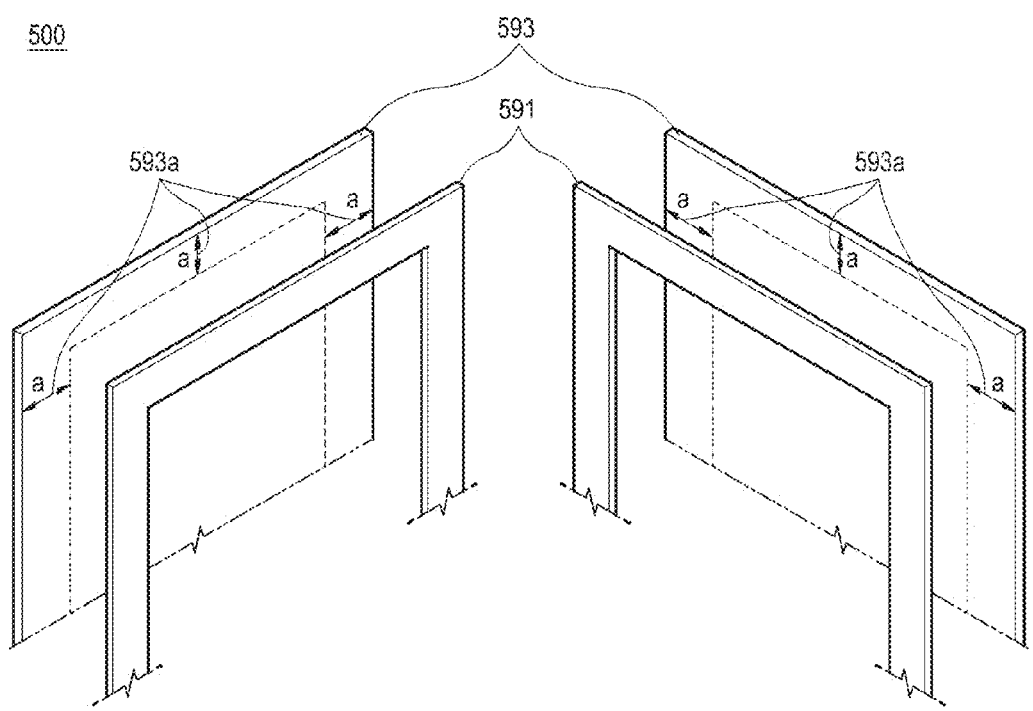
FIGS. 16A to 16C are an exploded perspective view and cross-sectional views showing embodiments of a hot-melt adhesive.
Figure 16B:
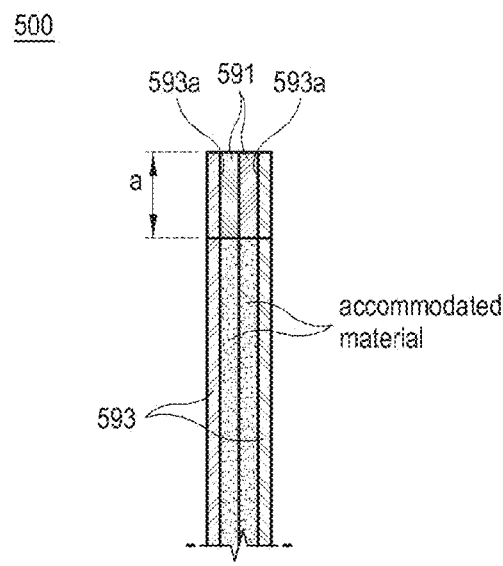
Figure 16C:
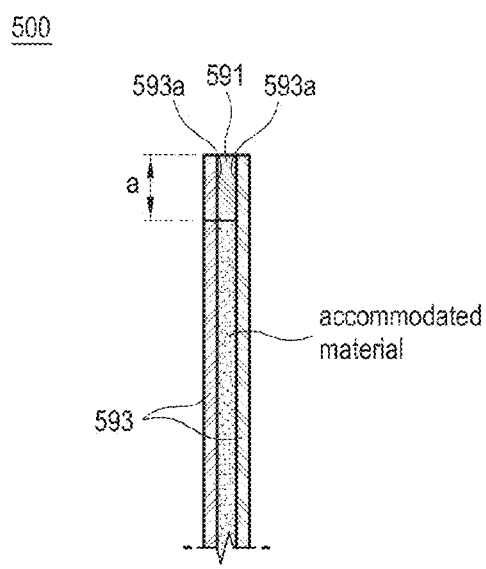
Figure 17A:
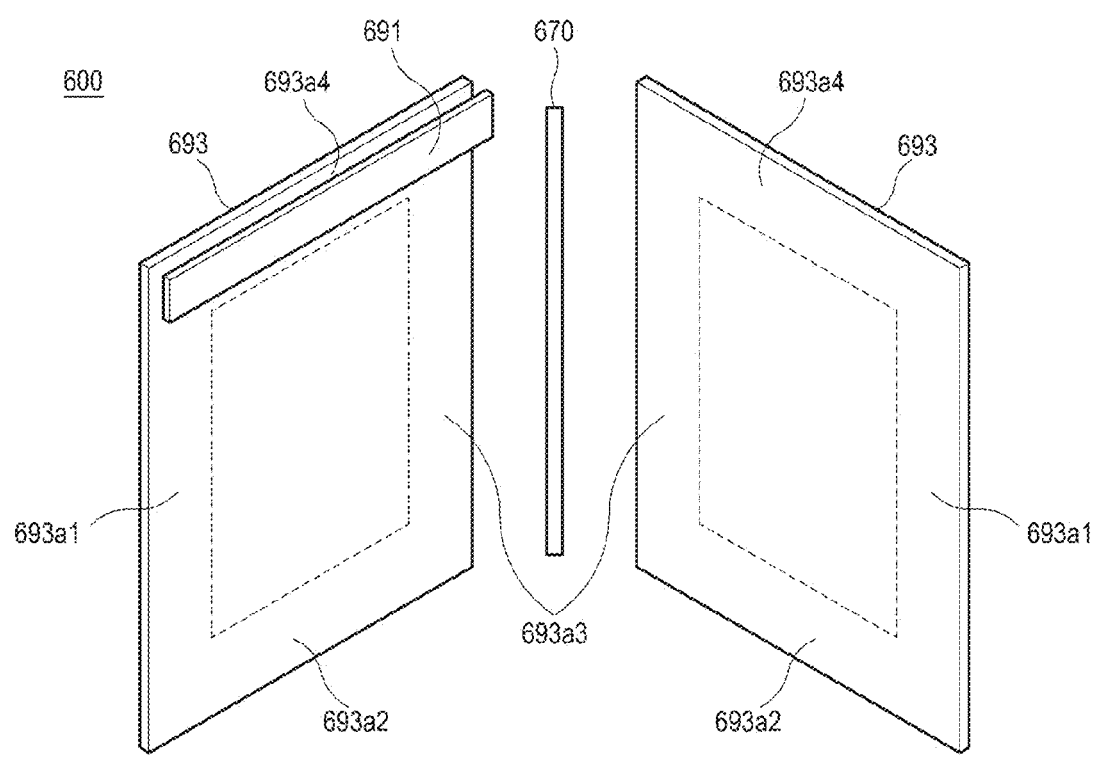
FIGS. 17A and 17B are an exploded perspective view and a cross-sectional view showing another embodiment of the hot-melt adhesive.
Figure 17B:
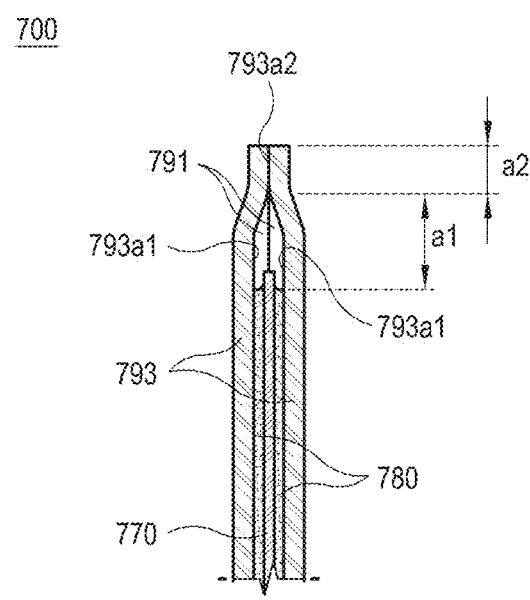

FIGS. 1A and 1B are views for explaining a manufacturing method according to an embodiment and another embodiment of the present invention, FIGS. 2A and 2B are a table and a picture showing a result of a chemical stability test according to various embodiments of a base film, FIG. 2C is a picture showing a result of a chemical stability test when the base film is a PP film, FIG. 3 is a picture showing a test for binding property of a current collector formed by plating when the base film is a PPS film, FIGS. 4A and 4B are a schematic view for explaining pretreatment and a process of forming the current collector when the base film is a PP film, and a picture showing a test for binding property of a plated current collector, FIG. 5 is a schematic view for explaining a process of forming an active material, FIGS. 6A to 6D are graphs showing electrochemical characteristics according to an embodiment of the present invention, FIGS. 7A to 7D are graphs showing electrochemical characteristics and a picture of an electrode according to another embodiment of the present invention, FIGS. 8A to 13D are graphs showing electrochemical characteristics according to other embodiments of the present invention, FIGS. 14A and 14b are an exploded perspective view and a sectional view for explaining an embodiment of a sealing material forming a capacitor device, FIG. 15 is a comparative table showing the kind and characteristic of a hot-melt adhesive, FIGS. 16A to 16C are an exploded perspective view and cross-sectional views showing other embodiments of a hot-melt adhesive, and FIGS. 17A and 17B are an exploded perspective view and a cross-sectional view showing another embodiment of the hot-melt adhesive.

According to an embodiment of the present invention, a method of manufacturing a flexible thin-film type super-capacitor device 100 (hereinafter, referred to as a 'capacitor device') includes operations of preparing a base film 110 (S110), forming a current collector 130 on the base film 110 (S120), forming an active material 150 of graphene oxide on the current collector 130 (S130), and coupling the base films 110 having the current collector 130 and the active material 150 to each other with a separator 170 therebetween so that the active materials 150 of the respective base films 110 can face each other.

In the capacitor device, a 'capacitor' refers to a lithium-ion capacitor (LiC), an electric double-layer capacitor (EDLC), a pseudo capacitor, a hybrid capacitor, a general electrolytic capacitor, and a general capacitor.

Below, the respective operations will be described in detail.

First, the base film 110 is prepared and its surface is pretreated (S110). The base film 110 may be selected from a plastic film and a functional film. The plastic film may include a polyphenylene sulfide (PPS) film, a polypropylene (PP) film and a polyethylene phthalate (PET) film. The functional film having an additional function may for example include a metal deposition film such as an aluminum deposition film used for an aluminum pouch.

The base film 110 may be chosen if it includes a material satisfying the requirements for flexibility, thermal and chemical stability, stably containing an electrolyte and being not corroded by the electrolyte. Hereinafter, the base film refers to an area for forming the current collector, and a reinforcing material refers to a means for reinforcing the base film. The base film and the reinforcing material may be made of the same material, and thus the base film may also serve as the reinforcing material. In FIG. 1A, a plating layer is formed on the PP film and the active material is formed on the top of the plating layer. In this case, the PP film is used as the reinforcing material and the plating layer is used as the base film. On the other hand, in FIG. 1B, an active material was directly formed on a nickel foil, and the PP film was attached to the back of the foil as the reinforcing material for containing the current collector, the active material, the separator and the electrolyte.

As examples of the base film 110, six films (①a polycarbonate (PC) film, ②a silicone film ③a polymethyl methacrylate (PMMA) film, ④a polyethylene naphthalate (PEN) film, ⑤a polyphenylene sulfide (PPS) film and ⑥a polyethylene terephthalate (PET) film) were selected among seven polymer films and tested. The test results are tabulated as shown in FIG. 2A, and photographed as shown in FIG. 2B. FIG. 2C shows the results of testing a polypropylene (PP) film.

As the test result for the thermal stability even at 70° C., the PPS film was maintained stable in both strong acid and strong base. The PC film, PEN film and PET film were selectively stable in only sulfuric acid. FIG. 2B shows the states of the films that are experienced the chemical stability test at a room temperature (i.e. 25° C.) and a temperature of 70° C. In result, the PPS film was excellent in the chemical stability. In addition, if sulfuric acid is used as an electrolyte, the PC film, PEN film and PET film may also be employed.

However, the PPS film the most excellent in performance is disadvantageous to mass production with low cost since its unit cost is relatively high. Taking this into account, the PP film was selected among the films capable of replacing the PPS film, as a material that is extensively used, is advantageous to the mass production, and satisfies cost performance. The PP film also has a virtue of forming an electroless nickel plating film more easily than the PPS film. FIG. 2C shows the state of the PP film tested with regard to the chemical stability at temperatures 25° C. and 70° C. under 6M KOH. As shown therein, it will be appreciated that the PP film is maintained stable regardless of the chemical stability test.

Then, the surface of the base film 110, which will not only be used as an electrode to be connected to an external power source but also form the current collector 130, is pretreated (S110). The pretreatment for the base film 110 may be achieved by a physical treatment method using sandpaper and the like tool for making the surface rough, a chemical treatment method such as etching, or both the physical and chemical pretreatment methods.

EXAMPLE 1

If the base film 110 is the PPS film, the surface of the base film 110 is made rough using sandpaper to be plated with an electroless nickel film, and is then put into ethanol to undergo ultrasonic cleaning.

EXAMPLE 2

If the base film 110 is the PP film, etching is performed in order to form an electroless nickel film, in which a solution where chromic acid 400 g/l and sulfuric acid 200 ml/l are mixed is used as an etching agent.

Below, the operations will be described according to various embodiments of the present invention.

EXAMPLE 3

The operation S120 of forming the current collector 130 on the pretreated surface of the base film 110 includes a method of making the current collector 130 maintain high binding strength with the flexible base film 110, have high performance, be simply manufactured and be economical with low cost.

For example, the base film 110 pretreated in <Example 1> is put into a Tin(II) Chloride solution (i.e. a solution where tin chloride (SnCl2) 5 g, hydrochloric acid (HCl) 20 mL and water (H2O) 500 mL are mixed) and thus sensitized. Then, the base film 110 is put into a palladium solution (i.e. a solution where palladium chloride (PbCl2) 0.125 g, hydrochloric acid (HCl) 1.25 mL and water 500 mL are mixed) and its surface is thus activated. Then, the pretreated base film 110 is soaked into the electroless nickel plating solution and thus its surface is plated with nickel (S120), thereby serving as the current collector 130.

In the electroless nickel plating solution, nickel sulfate (NiSO4) 25 g/l, disodium hydrogen phosphate (Na2HPO4) 50 g/l, sodium hyphosphite (NaH2PO2) 25 g/l and ammonium hydroxide (NH4OH) (pH titration) are included and mixed. The base film 110 soaked into the plating solution maintained at a temperature of 70° C. (at this time, pH 10.5) for about 10 minutes is taken out from the solution and then washed with deionized water. The current collector 130 plated with such nickel metal has a plating thickness of 10 μm and a low resistance of 30~70 mΩ/cm$^2$, thereby maintaining very good binding property between the current collector 130 and the base film 110. FIG. 3 are pictures showing that the binding property is tested using a tape (i.e. the Scotch Magic tape of 3M), in which there was little mark of nickel when the tape is attached and detached, and there was little change in the weight of the film before and after detaching the tape.

EXAMPLE 4

Palladium particles are attached to the surface of the base film 110 pretreated in <Example 2> through the catalyst process. At this time, a catalyst solution is made by mixing palladium chloride 0.25 g/l, Tin(II)chloride 20 g/l and concentrated hydrochloric acid 200 ml/l. Then, the washed base film 110 is soaked in a solution of sulfuric acid 150 g/l at a temperature 50° C. for 3 minutes, so that tin (Sn) ions can be removed and palladium (Pd) can be activated. After the activated base film 110 is dried, the base film 110 is soaked into the electroless nickel plating solution at 70° C. and electroless plating is performed for about 3 minutes. Then, nickel strike plating is performed by electrolytic plating, in which a nickel strike plating solution is made including nickel sulfate 240 g/l, nickel chloride 45 g/l and boric acid 30 g/l. The base film 110 plated with electroless nickel undergoes electrolytic plating at a temperature of 55° C. under an electric current of 20 mA/cm2 for 17 minutes, thereby completing an electric plating process. According to an embodiment of the present invention, the current collector 130 of a nickel layer having a thickness of about 10-12 μm and a low resistance of 3-4 mΩ/cm$^2$ is formed with excellent binding property on the surface of the base film 110 (refer to FIG. 4B).

FIG. 4A schematically shows such a process.

In this example, the current collector 130 is formed by a plating method, but not limited thereto. Alternatively, one of a vacuum deposition method, a screen printing method, a stamping method, a method of using paste or slurry, and the like methods may be selected for forming the current collector 130 as well as the plating method. Further, not only a conductive layer formed by such a variety of methods but also a conductive film including a metal foil, a conductive polymer, a carbon material, a conductive composite, etc. may be used as the current collector according to an embodiment of the present invention.

EXAMPLE 5

In the foregoing embodiments, nickel is used as an embodiment of metal for forming the current collector 130, but not limited thereto. Alternatively, the foregoing plating metal may be selected from a group consisting of platinum (Pt), silver (Ag), gold (Au), copper (Cu), aluminum (Al), palladium (Pd) and iridium (Ir).

EXAMPLE 6

The active material 150 may be formed on the current collector 130 without using adhesive or the like by a simple, convenient and economical method (S130).

That is, by the Hummer's method, graphene oxide is formed, and a graphene oxide solution such as ink is formed. For example, an adequate amount of graphene oxide solution is dropped on the current collector made of gold and shaped like a coin having a diameter of 2.54 cm, and then graphene oxide is deposited on the surface of gold current collector in a hot plate of 90° C. through hydrothermal evaporation. Then, graphene oxide is reduced using light of camera flash, and put into an oven at a temperature of about 200° C. so that residual water can be removed and at the same time the active material of graphene can be formed on the current collector 130 through additional thermal reduction (S140). FIG. 5 schematically shows such an embodiment.

Detailed processes according to an embodiment of the present invention have been disclosed in 'Graphene-based Device of Thin-film Suppercapacitor Electrode directly using Graphene-oxide Solution and Manufacturing Method thereof' applied by the present applicant, and thus repetitive descriptions thereof will be avoided.

According to an embodiment of the present invention, the graphene structure deposited through the hydrothermal evaporation deposition is guided to form layers while fully maintaining a coupled state without being broken or damaged. Thus, it is possible to improve the product reliability and binding property of the active material.

Such the manufactured electrodes (hereinafter, the electrodes refer to that the current collector 130 and the active material 150 are included in the base films 110) is put into an electrode test kit (ECC-Aq, EL-Cell, Germany) and assembled together with 6M KOH injected therein, in which the electrochemical characteristics are made as a graph in FIGS. 6A to 6D. Referring to FIGS. 6A to 6D, specific capacitance obtained at 5 mV/s is 178.8 F/g with respect to a half-cell, and specific capacitance obtained at 1000 mV/s is 145.4 F/g which is decreased by about 18.7%. Equivalent series resistance (ESR) obtained by measuring alternating current (AC)-impedance is 0.26 Ωcm$^2$ which is relatively low. In addition, there was no decrease in capacity even at a cycle life test of about 100,000 times.

Alternatively, the active material may include organic or inorganic electrode active materials that can constitute a super capacitor electrode including publicly known carbon, for example, a carbon material, a carbon hybrid material, metal oxide, nitride, sulfide, conductive polymer, etc.

EXAMPLE 7

Figure 7A:
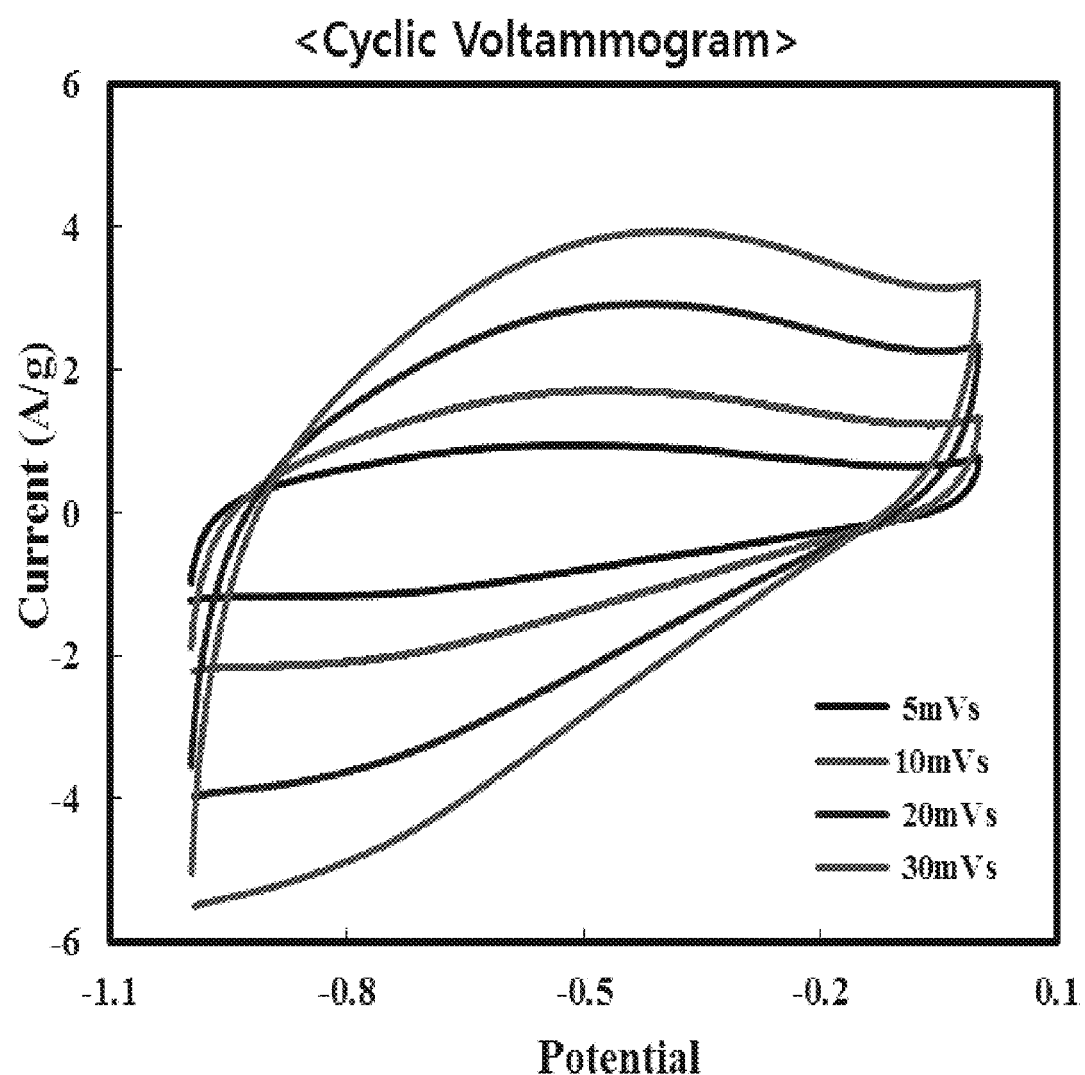
FIGS. 7A to 7D are graphs showing electrochemical characteristics and a picture of an electrode according to another embodiment of the present invention.
Figure 7B:
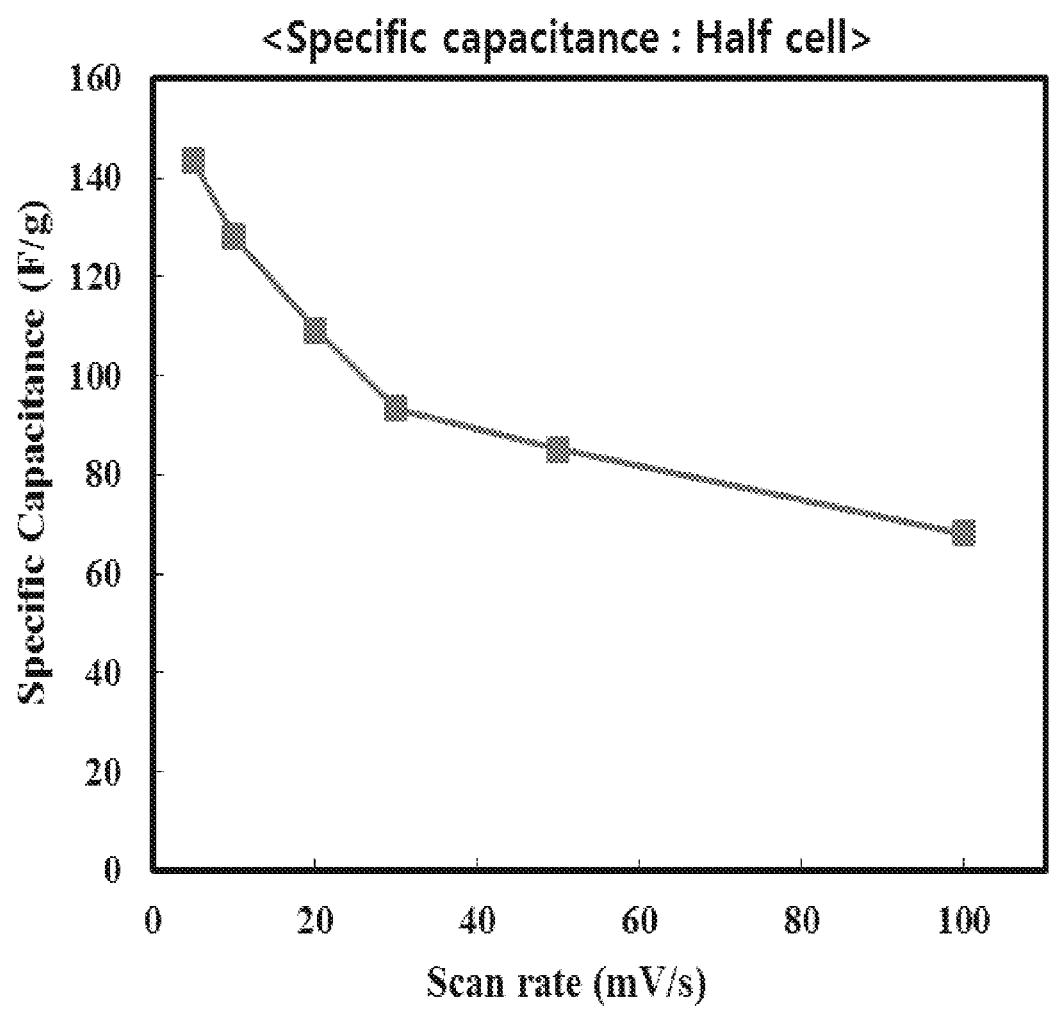
Figure 7C:
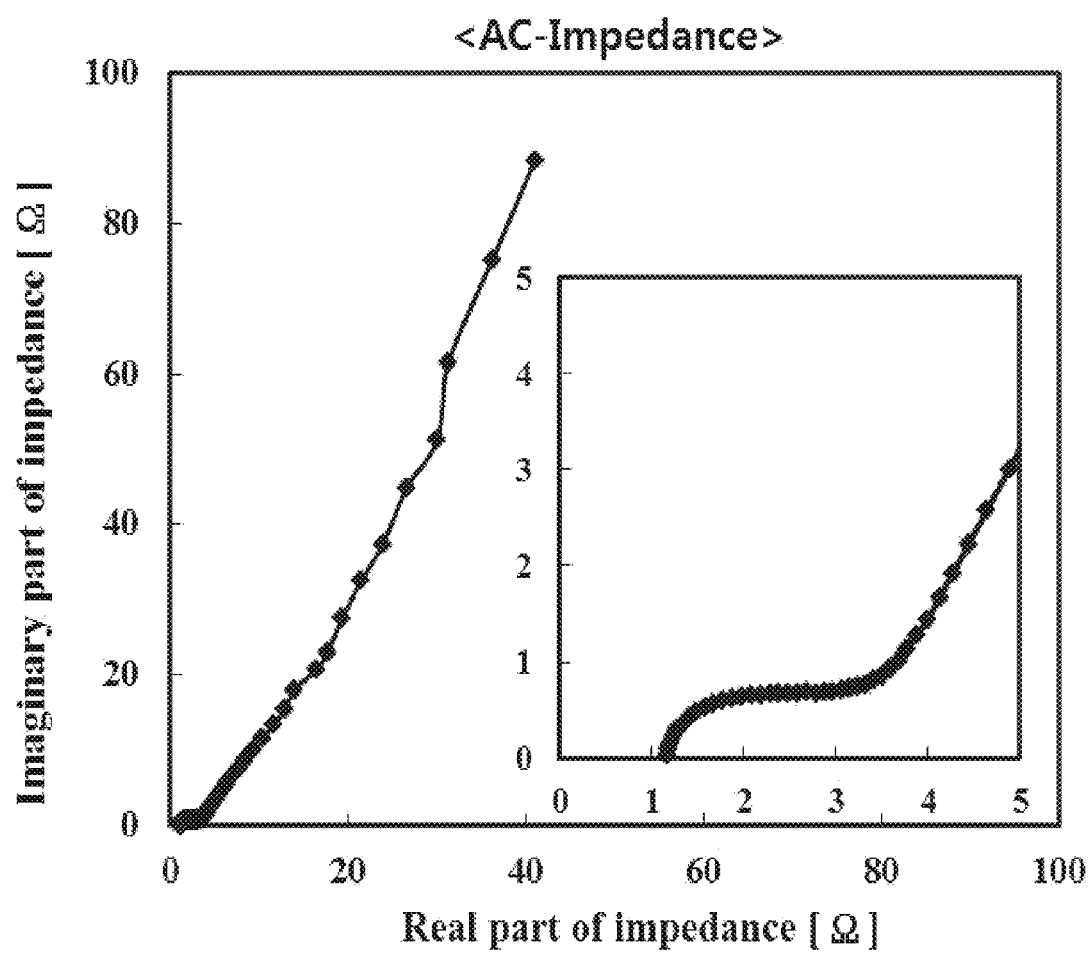
Figure 7D:
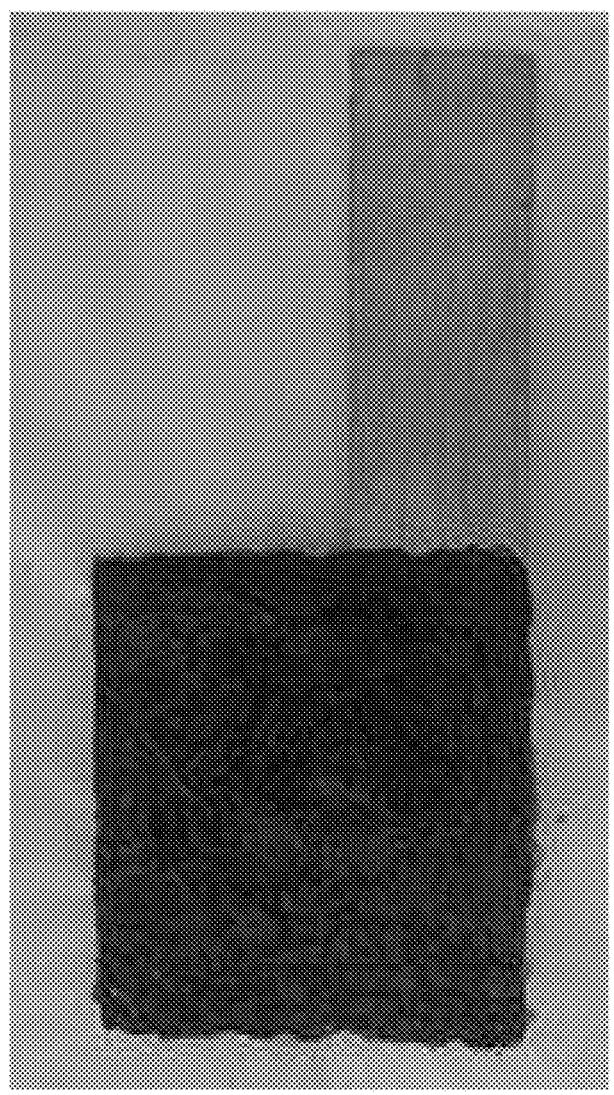

Graphene oxide reduced by the hydrothermal evaporation deposition method and the flash reduction method according to the <Example 6> is deposited on the nickel current collector 130 formed on the base film 110 of the PPS film according to the <Example 3>. Next, the formed electrode is thermally treated at 110° C. for 8 hours so as to eliminate water and is then put into a beaker filled with 6M KOH. FIGS. 7A to 7C show results from a triode test, and FIG. 7D is a picture showing the formed active material 150.

Referring to FIGS. 7A to 7C, the cycle voltammogram shows that a typical rectangular shape of an electric double layer is maintained up to 30 mV/s, the specific capacitance obtained at 5 mV/s is 143.5 F/g with respect to the half-cell, and equivalent series resistance (ESR) obtained under measurement of AC-impedance is 1.16 $\Omega cm^2$.

EXAMPLE 8

Referring to FIG. 1A, by a method similar to the method of forming the capacitor device 100 according to <Example 7> of the present invention, the respective base films 110 having the current collector 130 and the active material 150 are coupled to each other with a separator 170 therebetween so that the active materials 150 can face each other (S140).

That is, a hot-melt adhesive (not shown) including epoxy is thinly applied around the active material 150, and a separator 170 is sandwiched between the active materials 150. In this state, the active materials 150 are pressed at a room temperature, thereby completing the capacitor device 100. The electrode of the finally completed capacitor device 100 has an area of 4 cm$^2$ (2 cm×2 cm) and a thickness of about 110 μm. 6M KOH is injected into the assembled capacitor device 100, and then the capacitor device 100 is vacuum-impregnated for about 30 minutes so that an electrolyte can be well-infiltrated into the active materials 150.

Figure 8A:
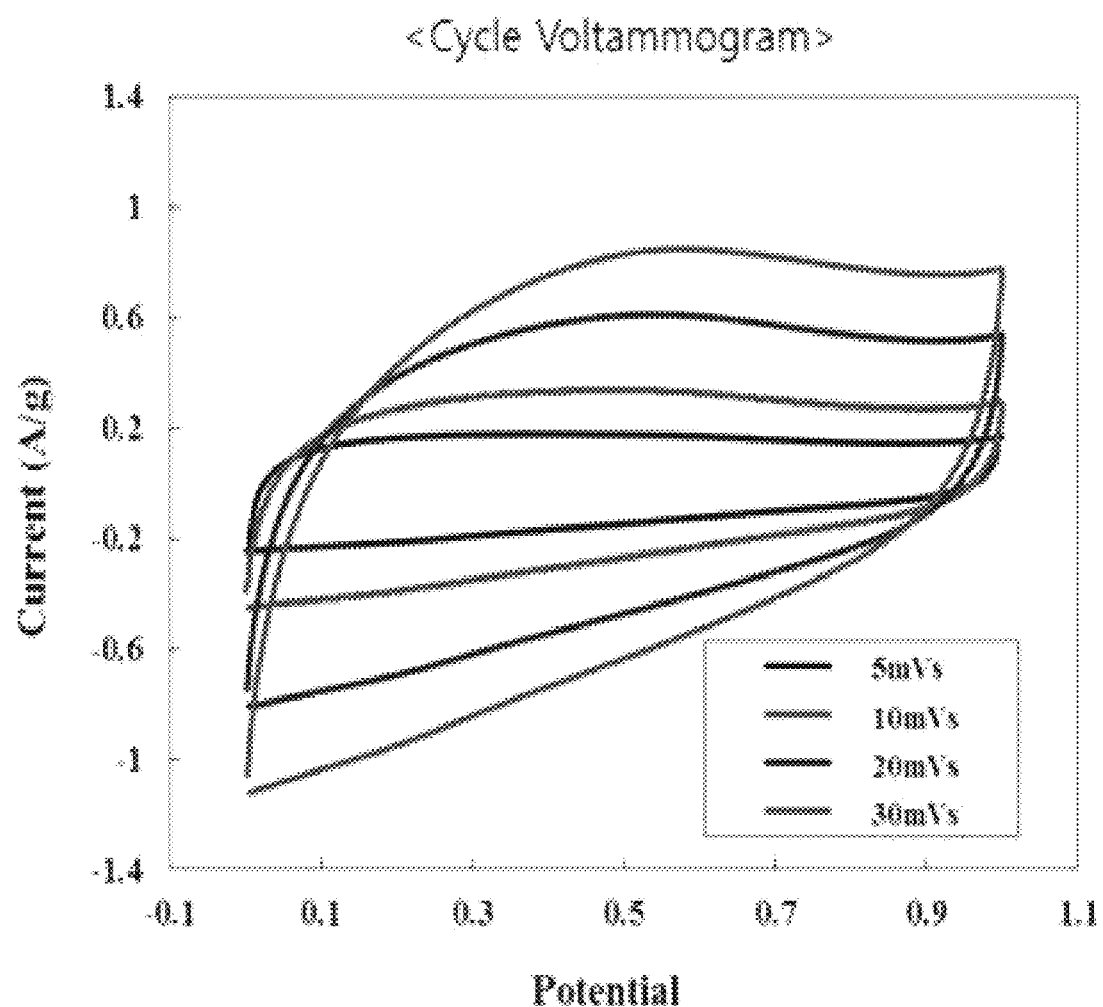
FIGS. 8A to 13D are graphs showing electrochemical characteristics according to other embodiments of the present invention.
Figure 8B:
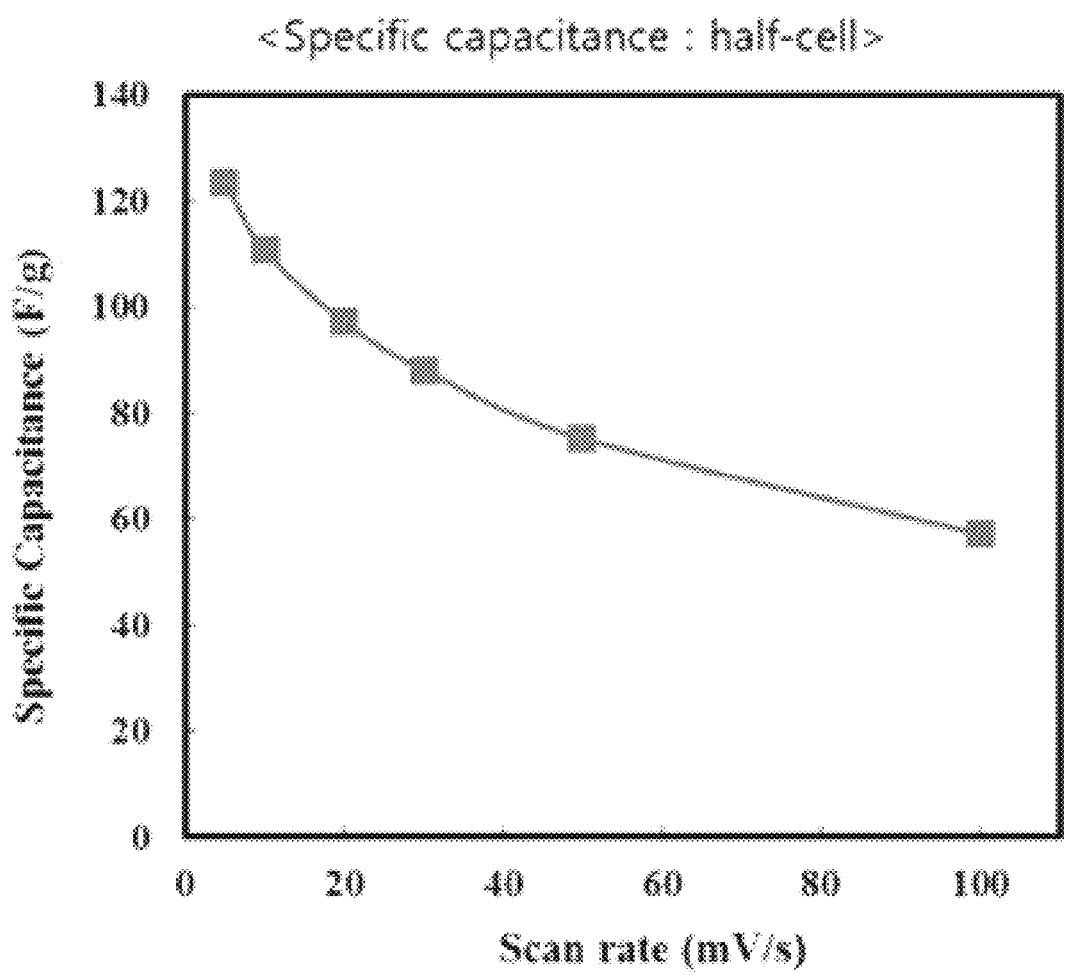
Figure 8C:
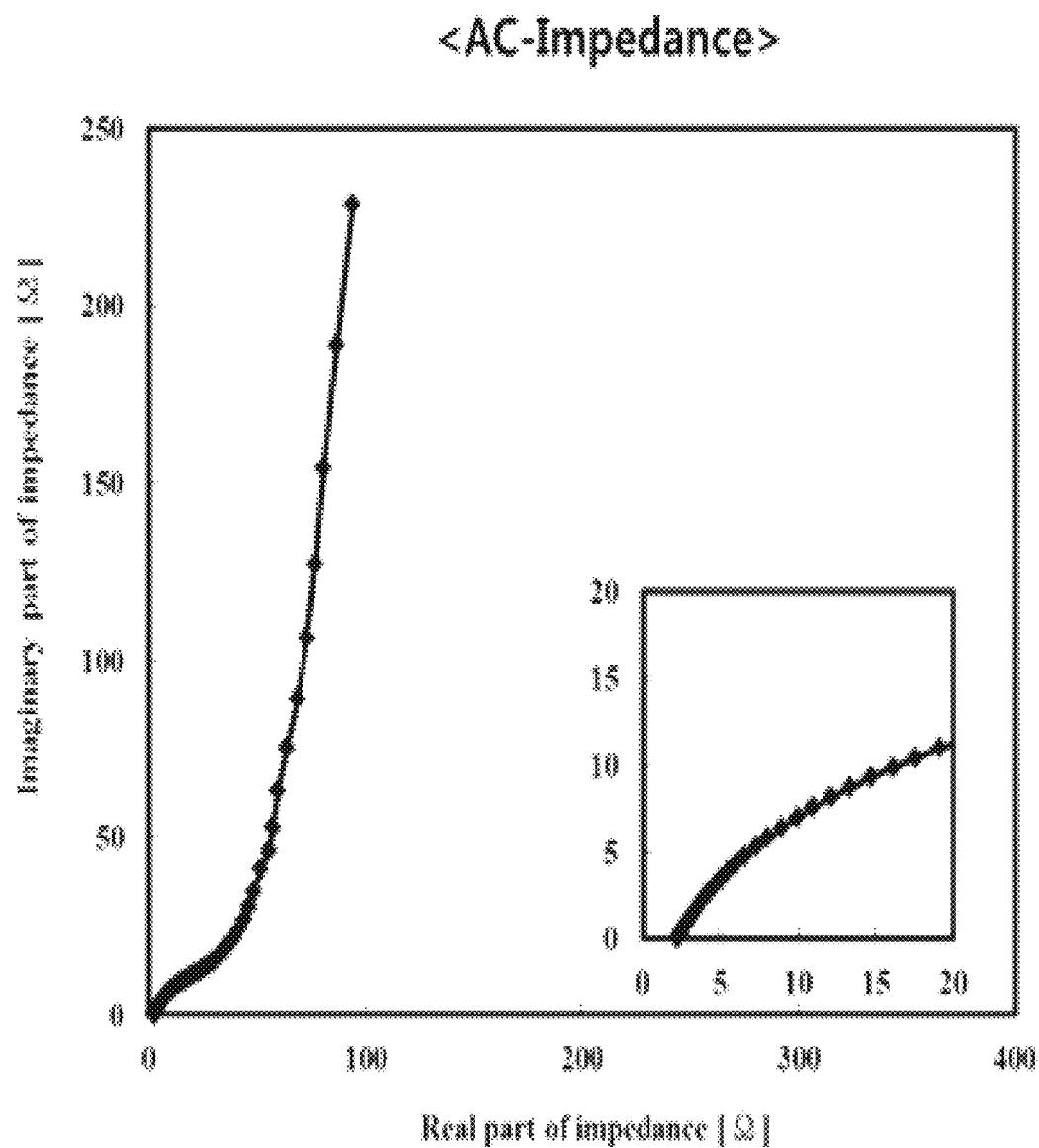
Figure 9A:
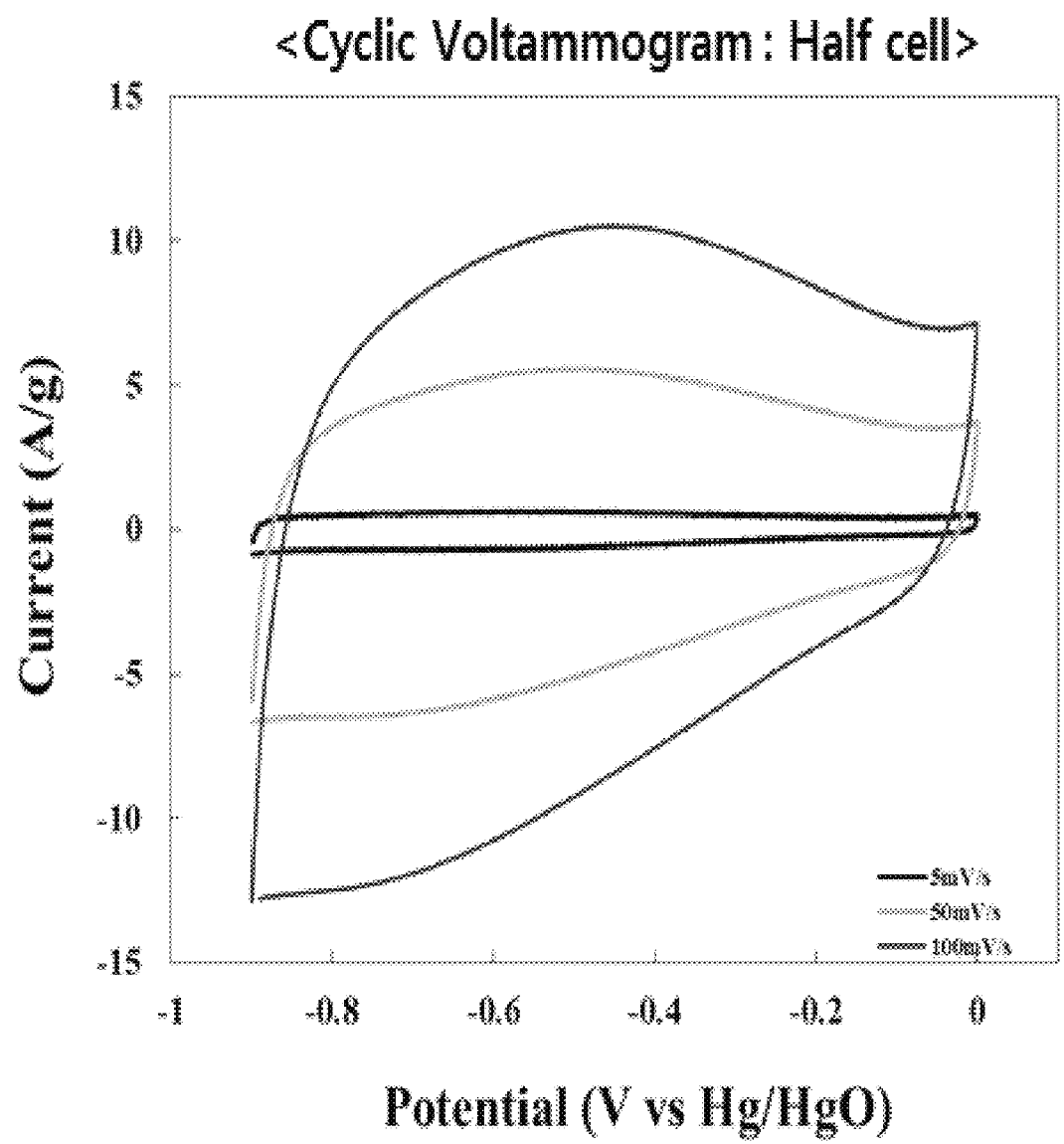
Figure 9B:
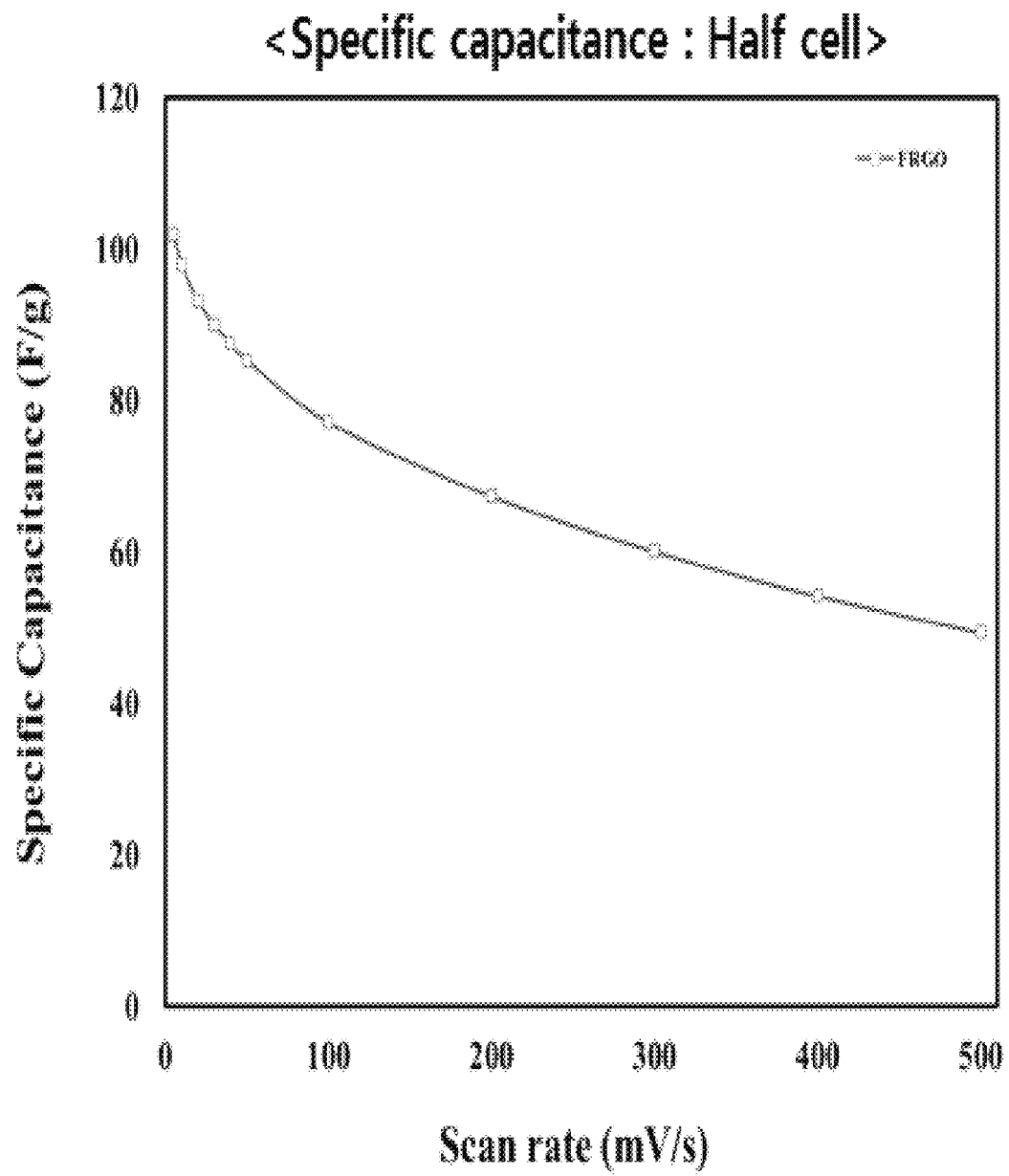
Figure 9C:
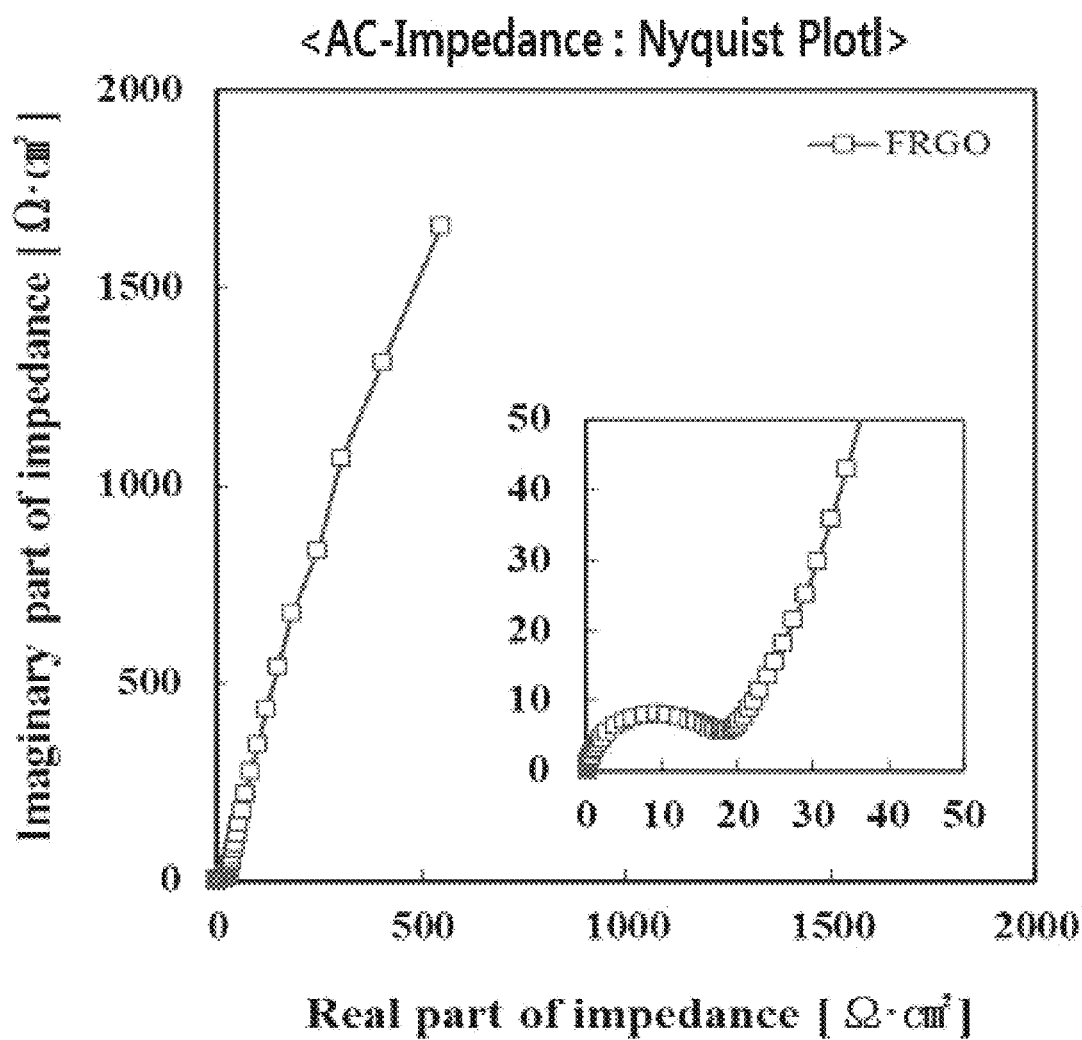
Figure 9D:
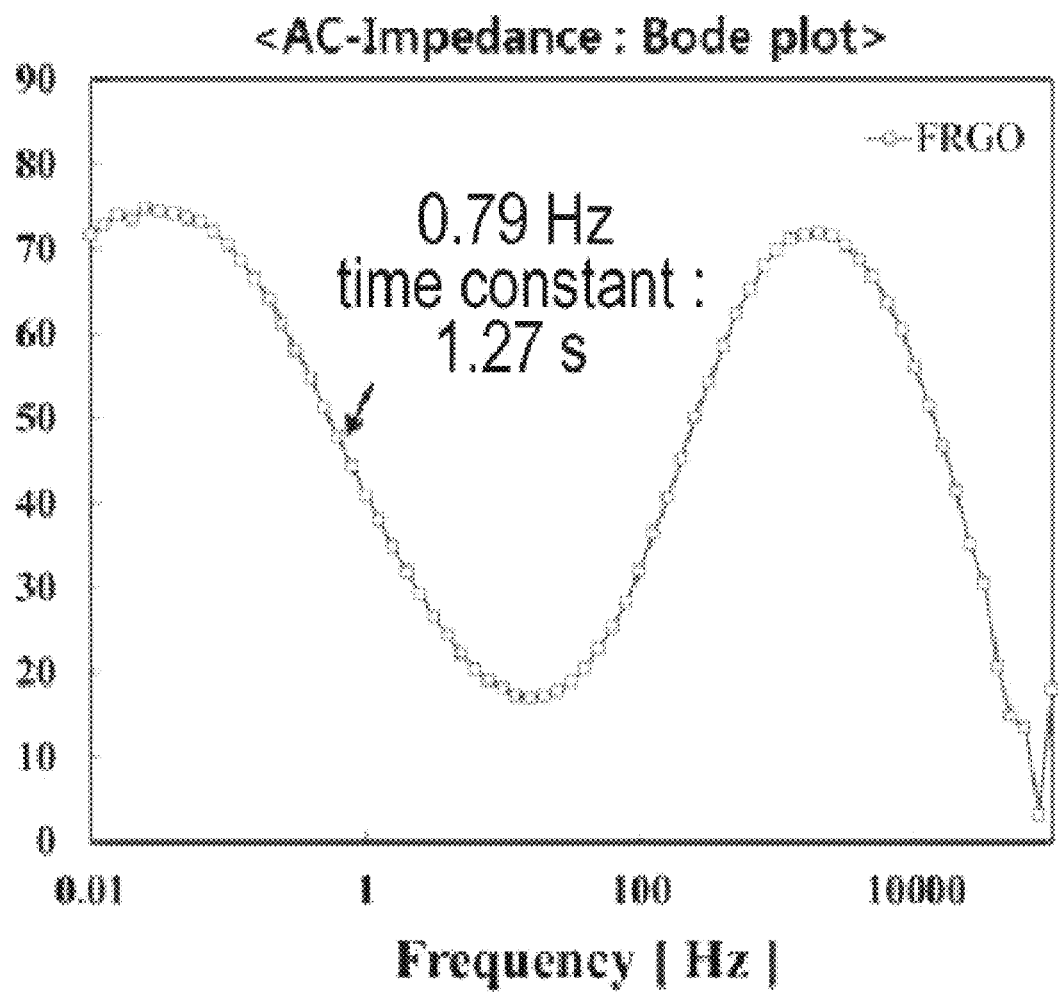
Figure 10A:
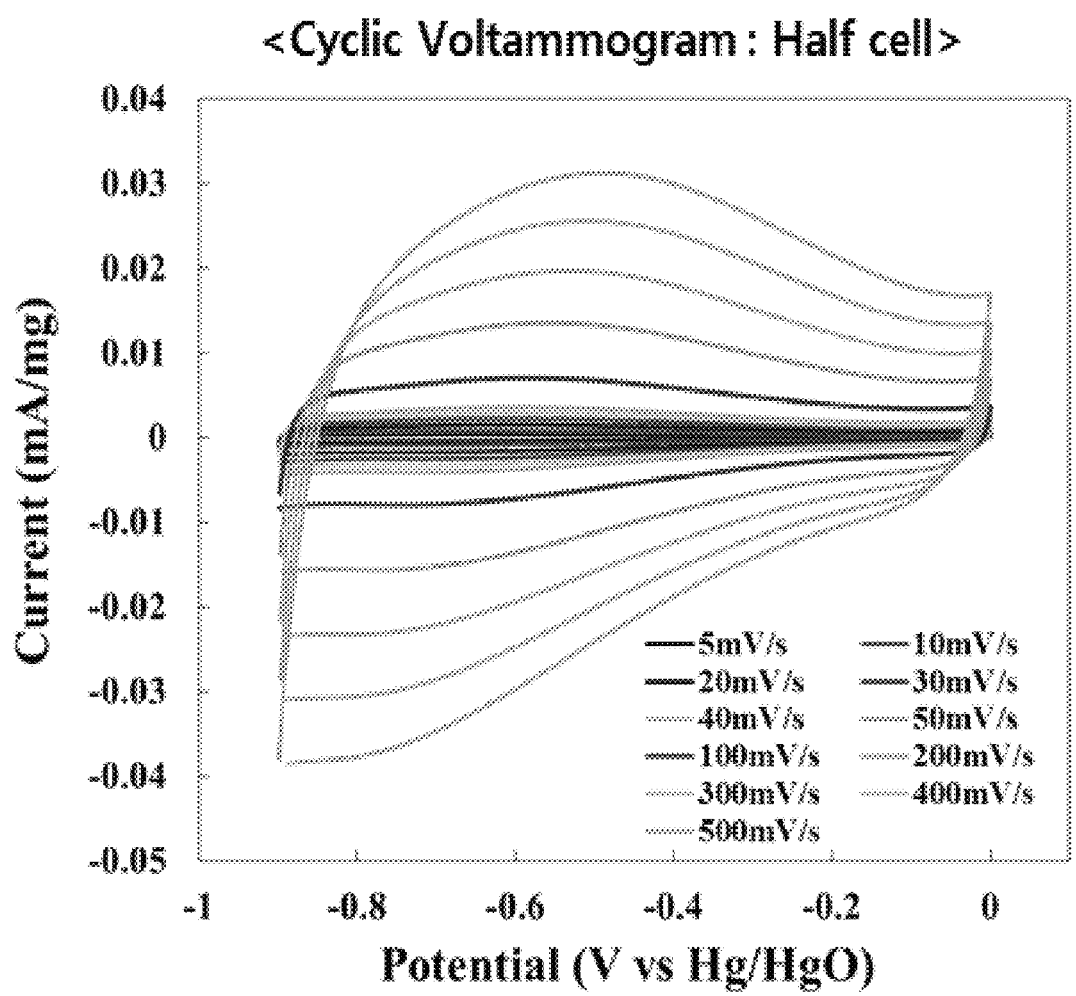
Figure 10B:
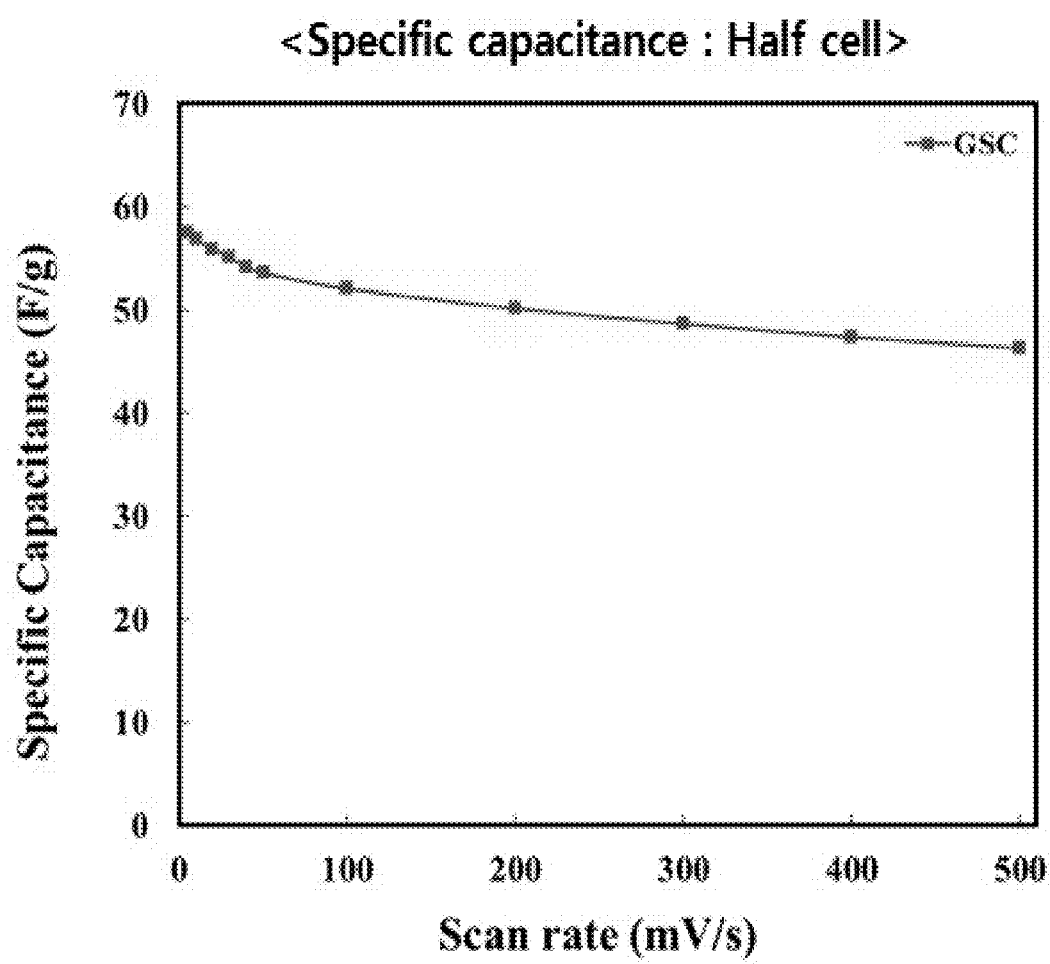
Figure 10C:
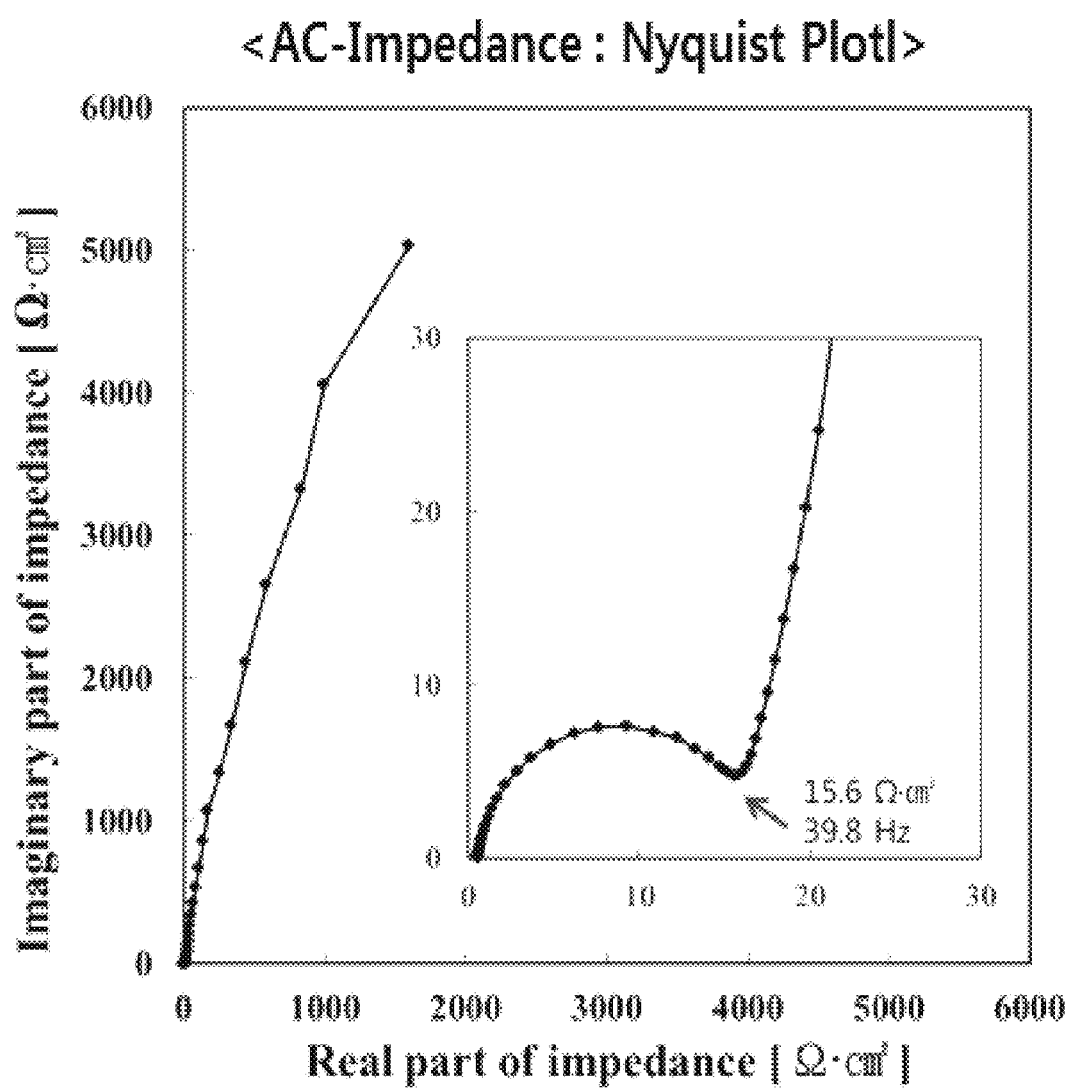
Figure 10D:
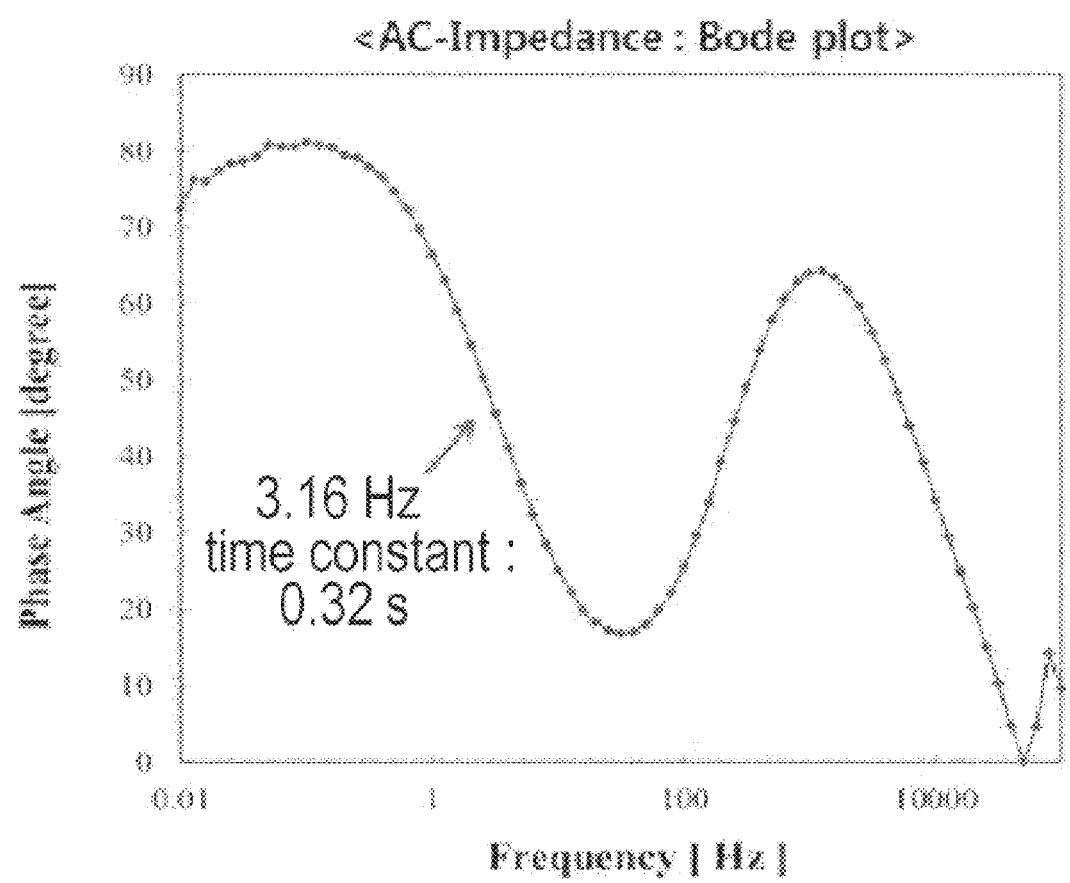
Figure 11A:
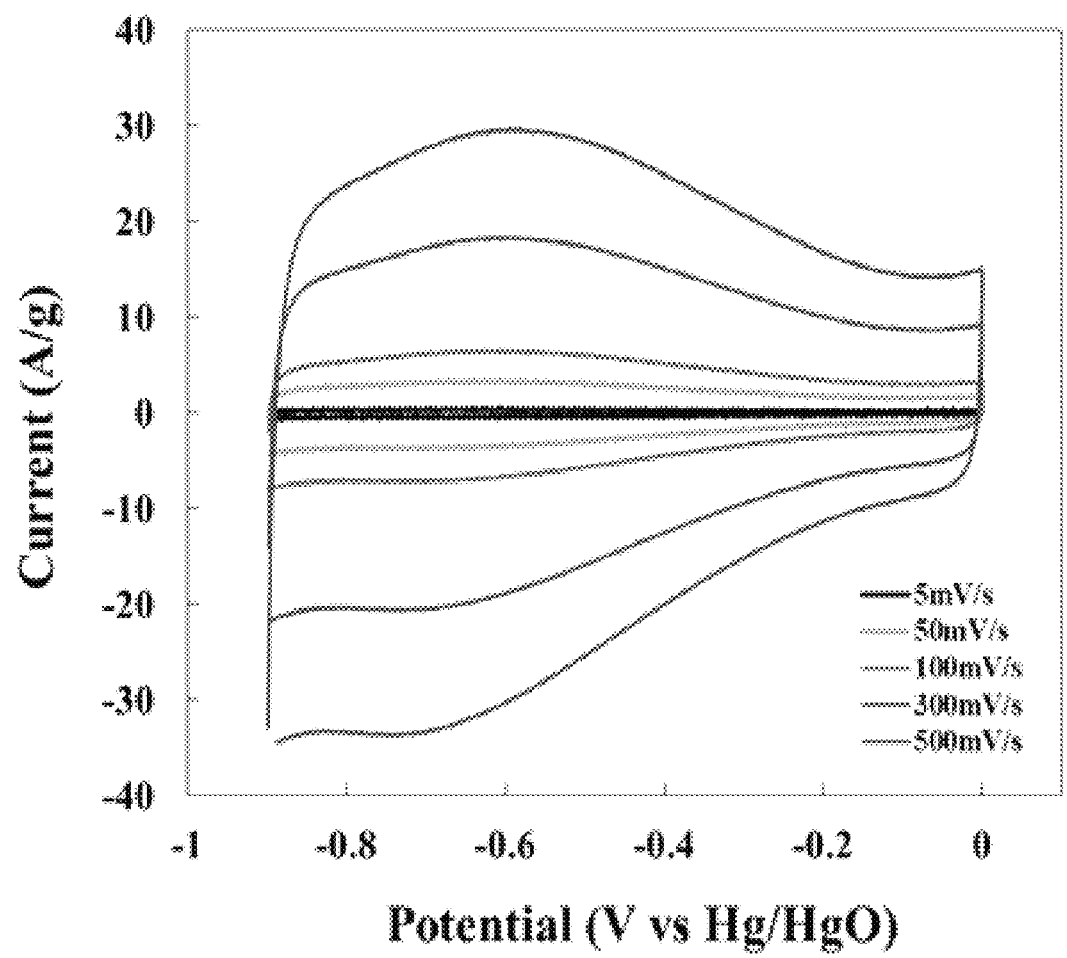
Figure 11B:
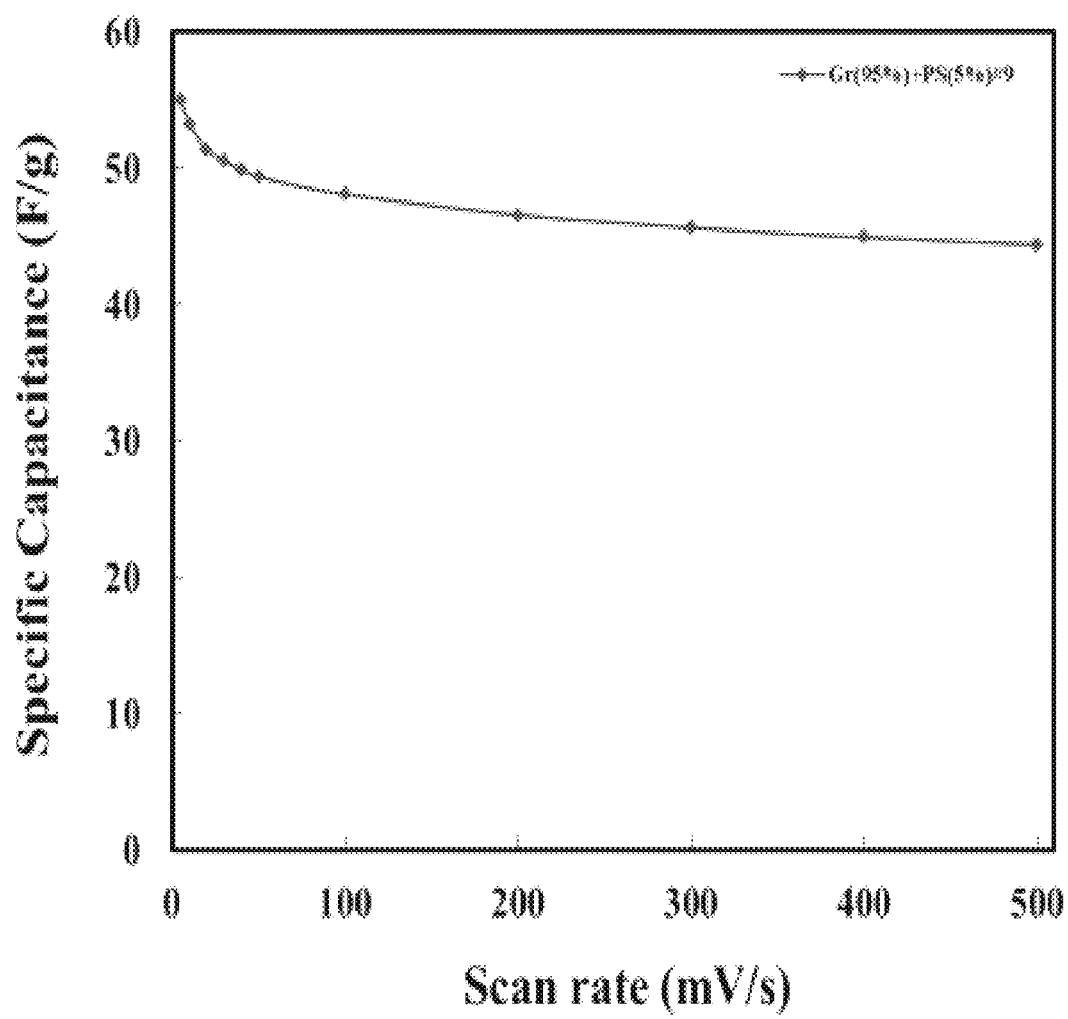
Figure 11C:
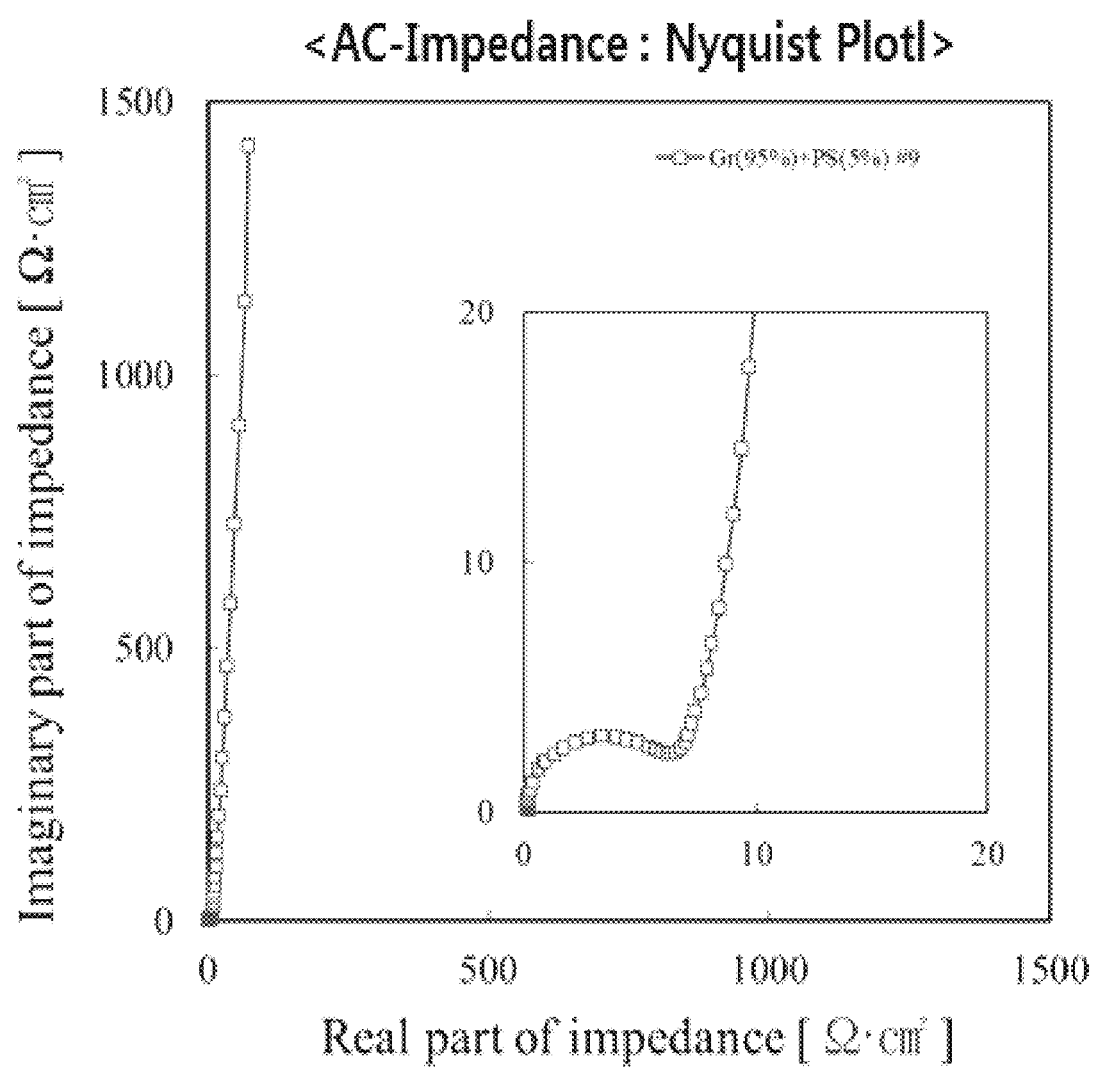
Figure 11D:
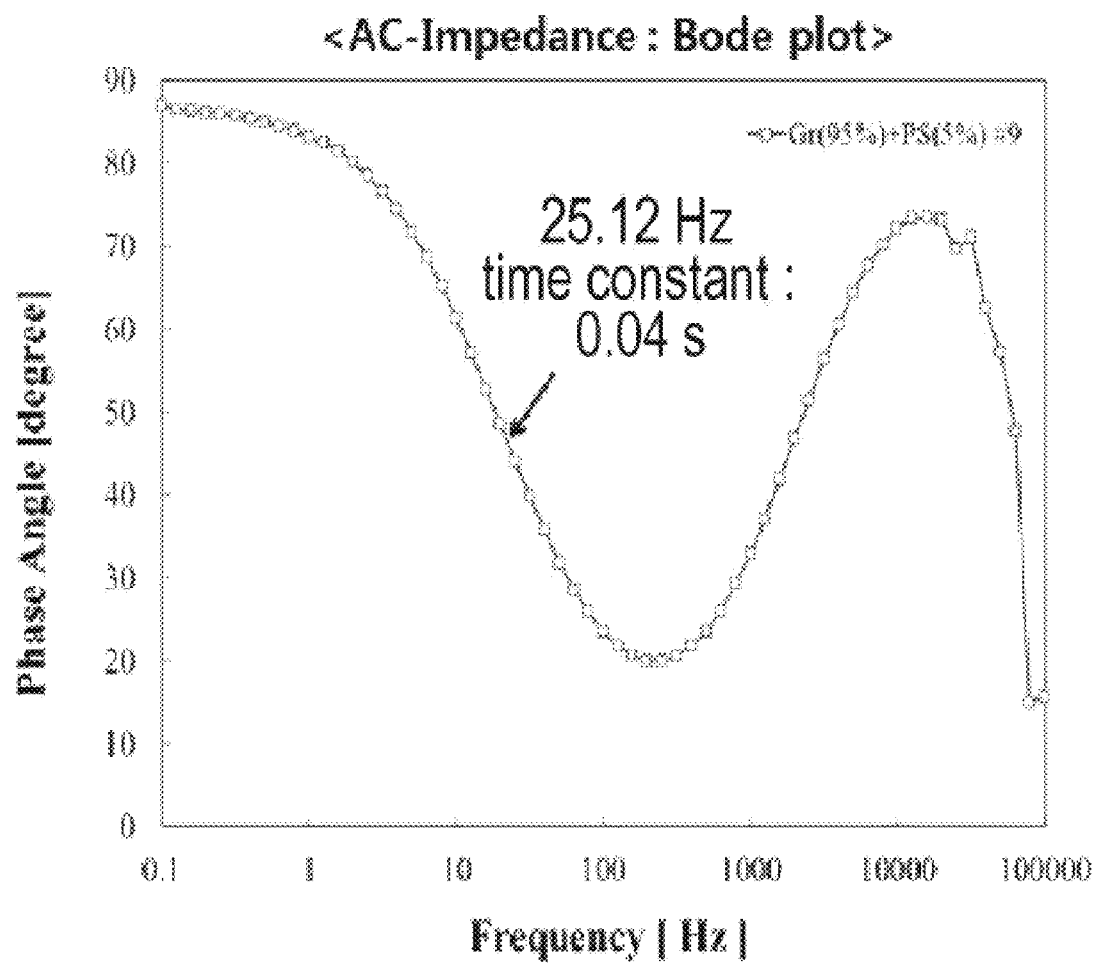
Figure 12A:
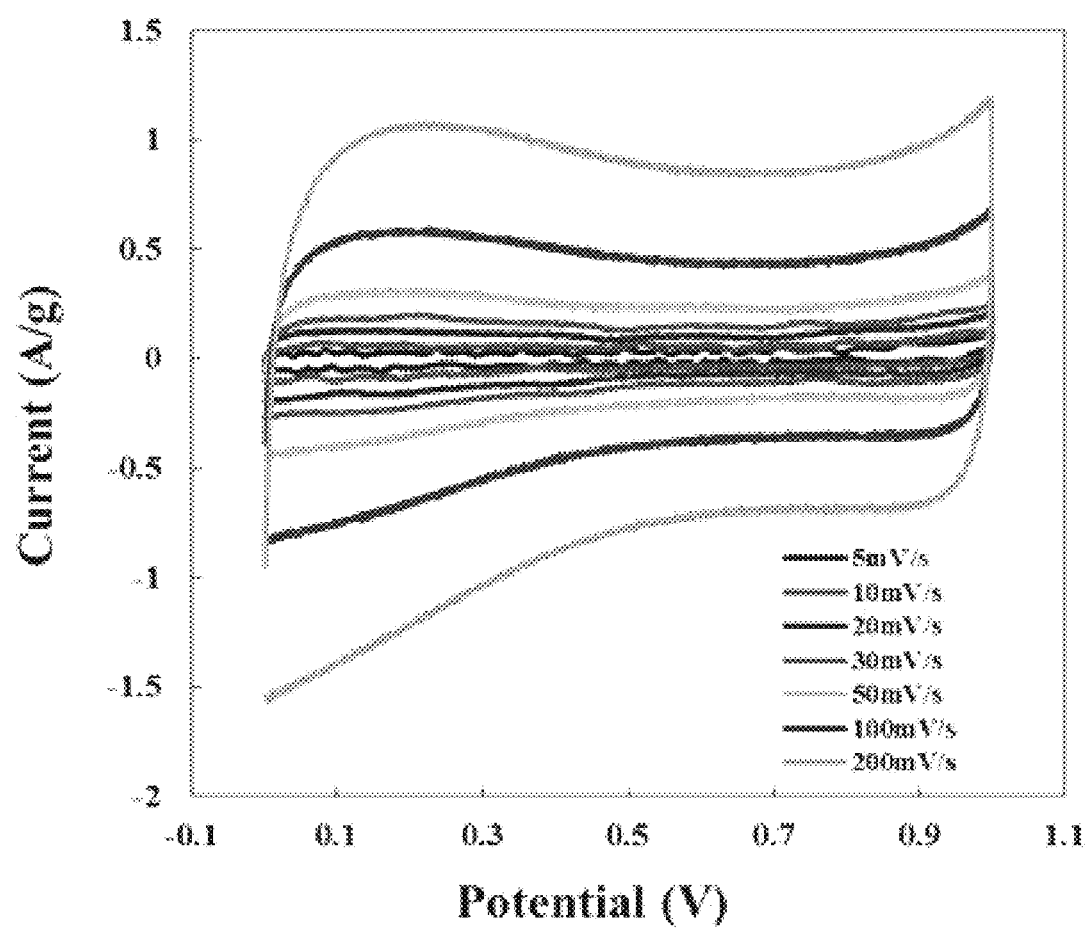
Figure 12B:
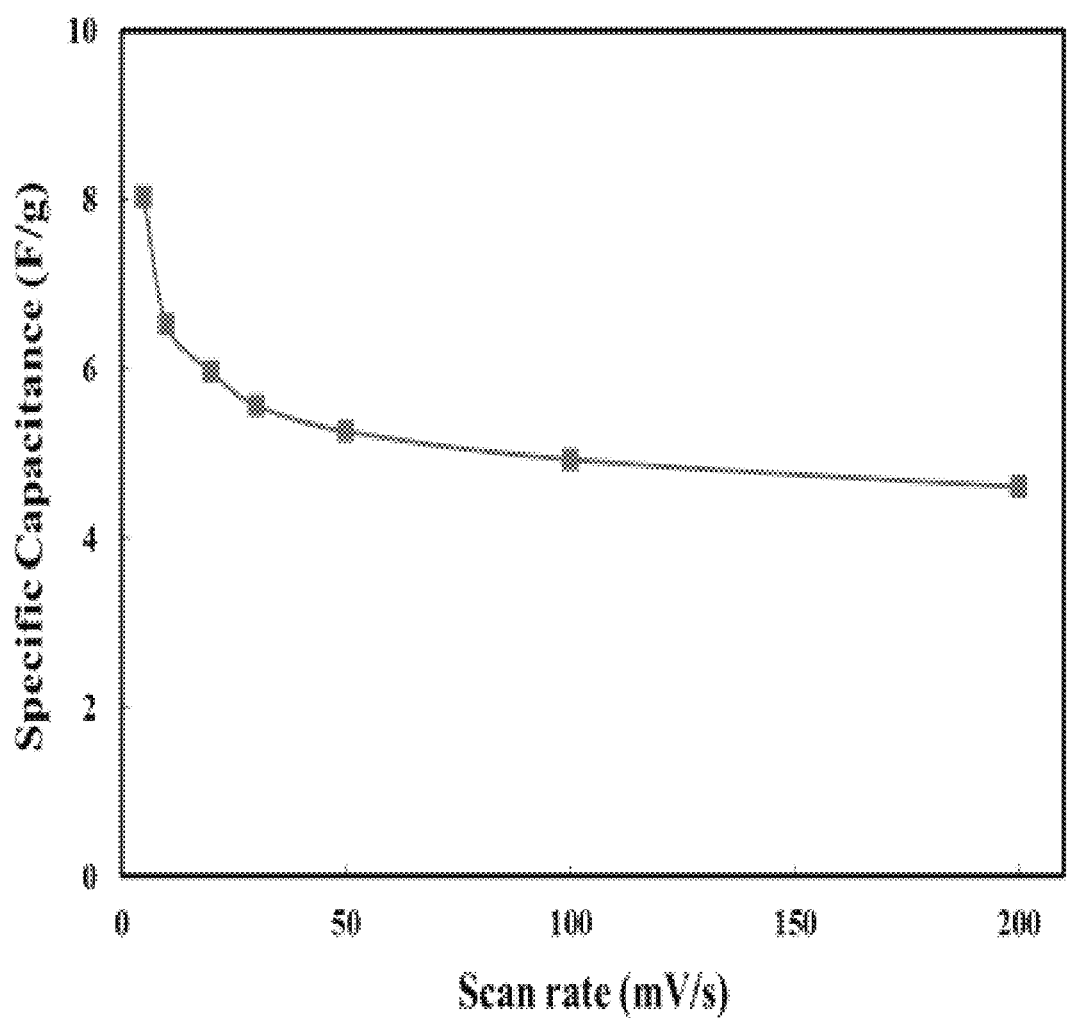
Figure 12C:
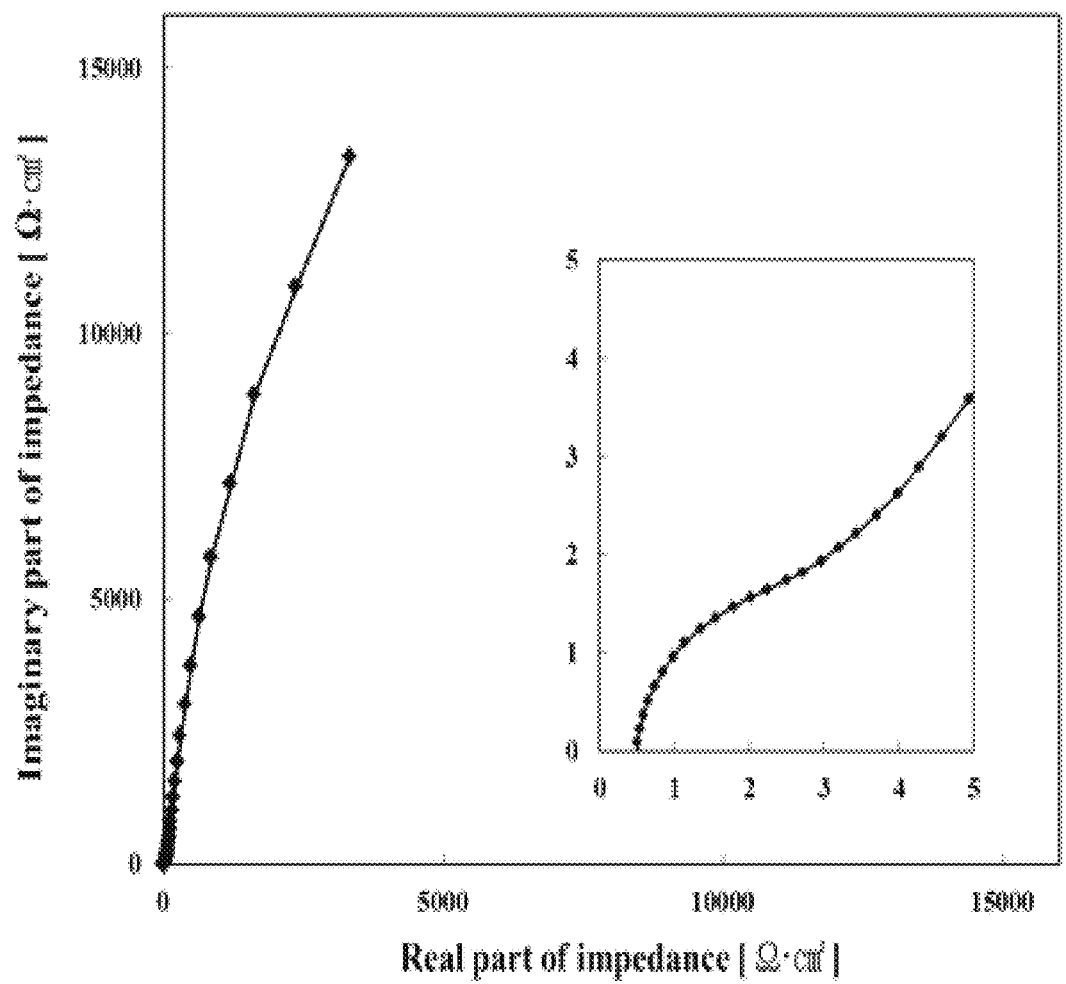
Figure 12D:
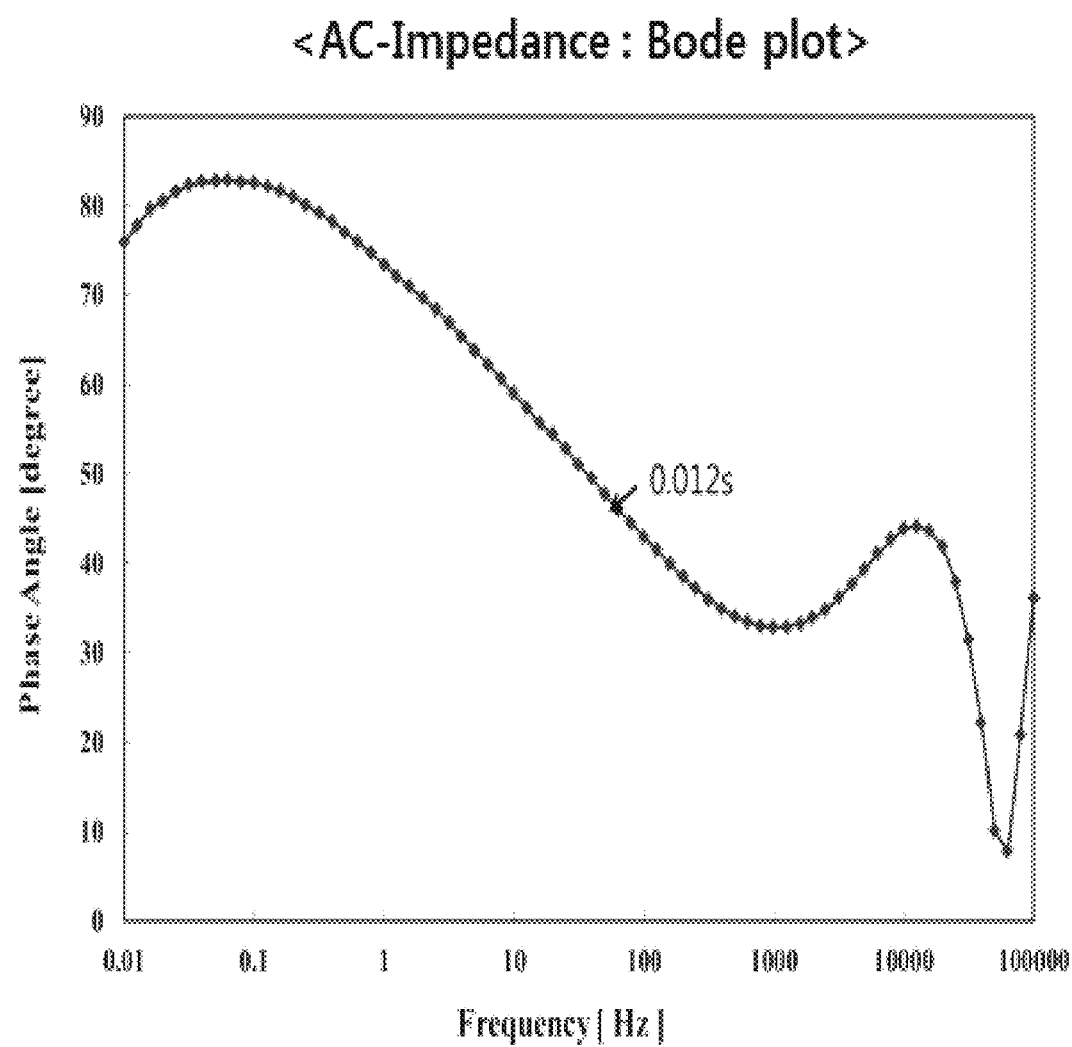
Figure 13A:
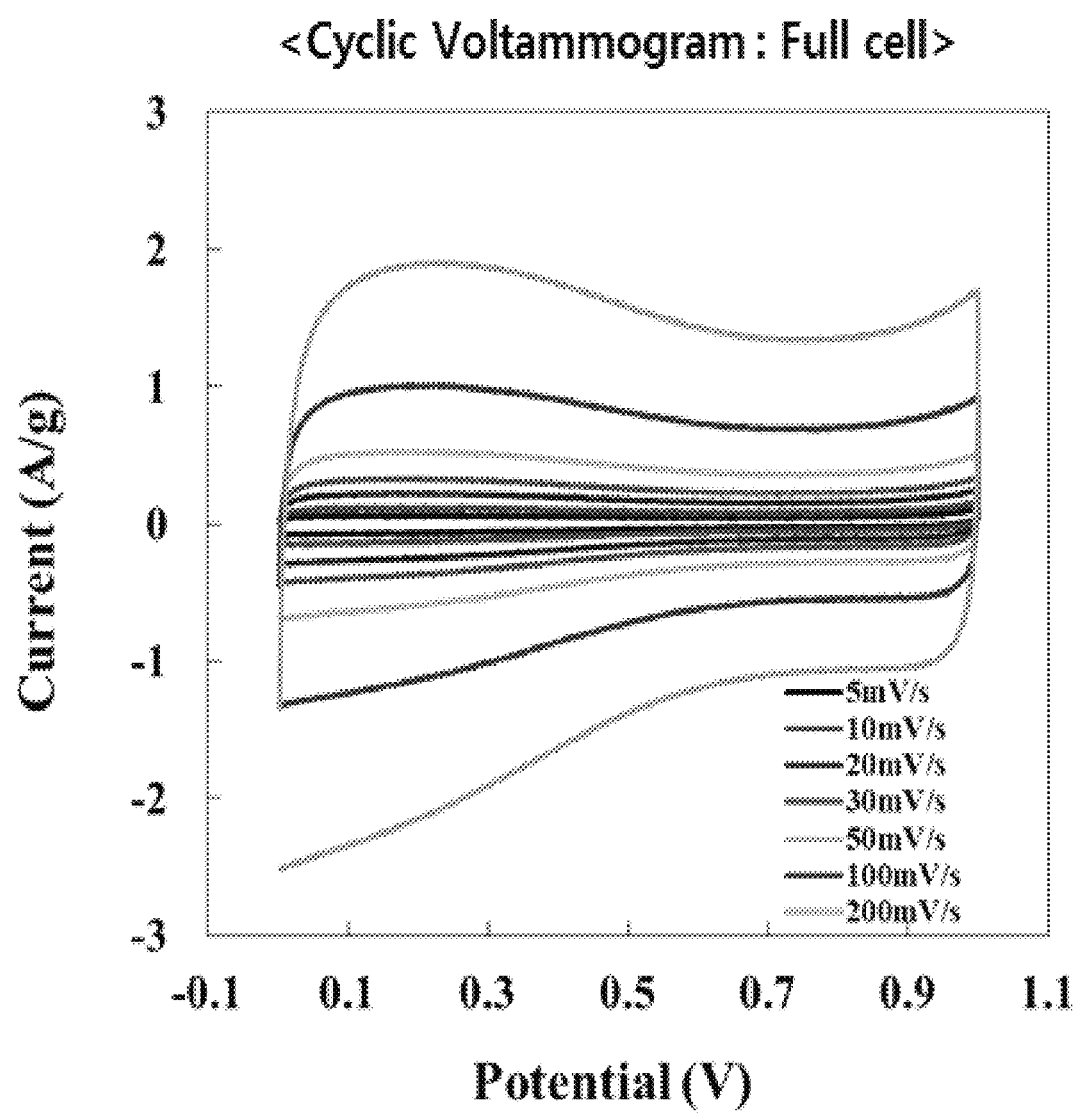
Figure 13B:
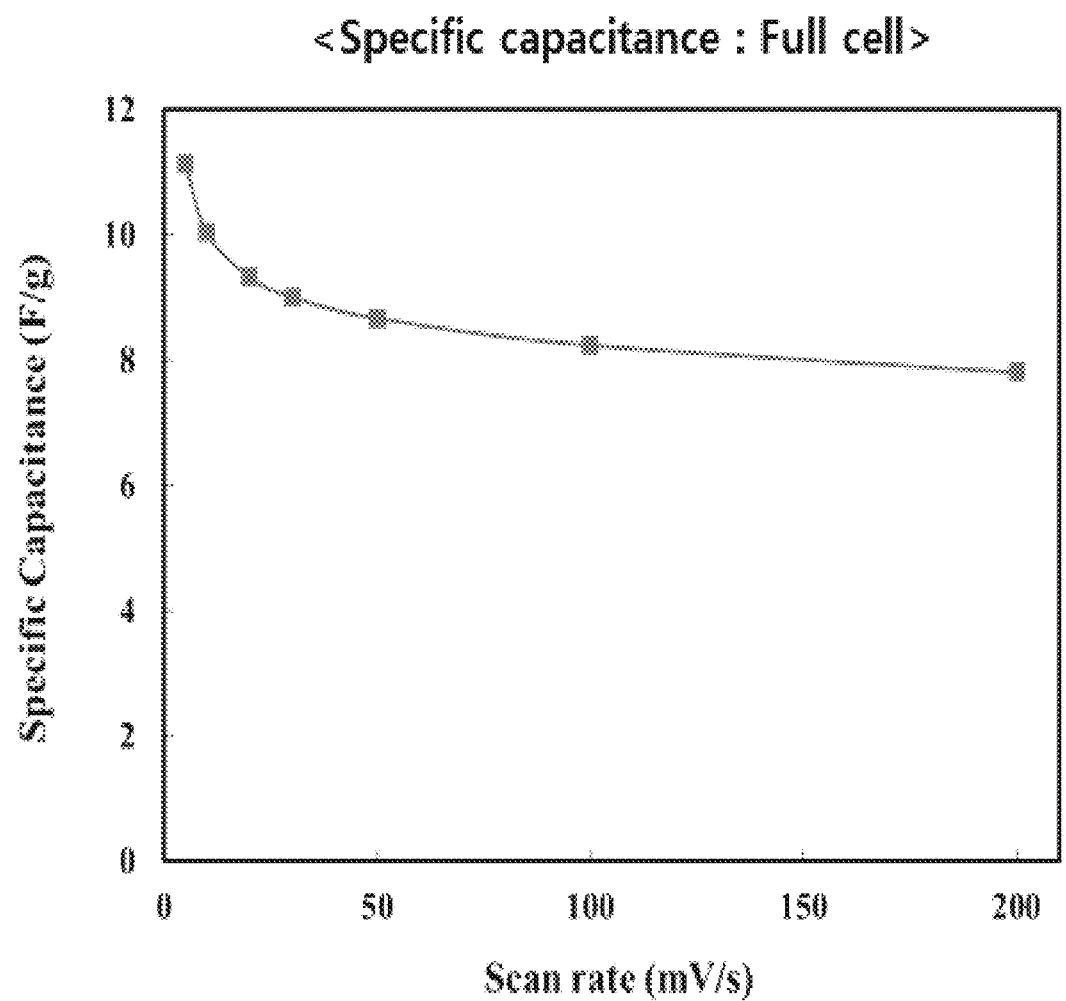
Figure 13C:
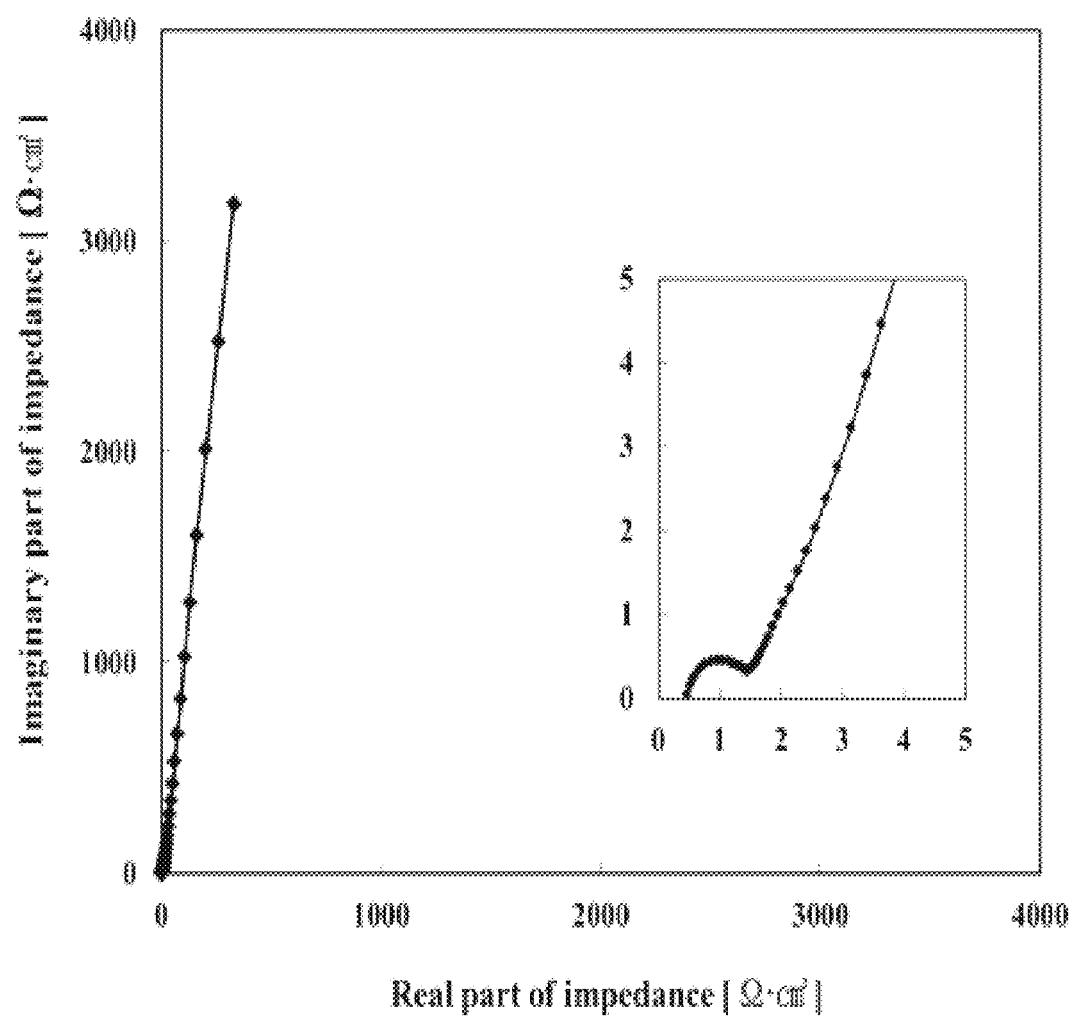
Figure 13D:
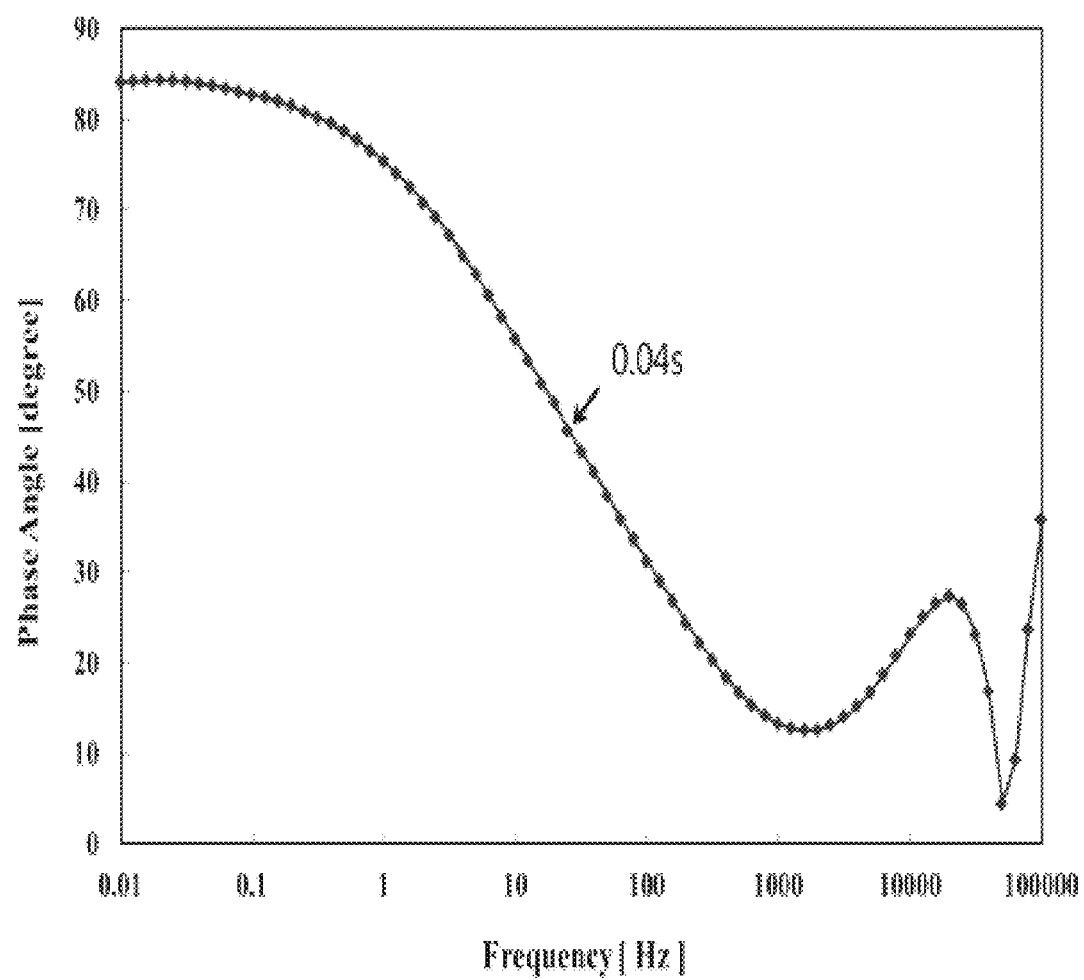

FIGS. 8A to 8C show the electrochemical characteristics of the capacitor device 100 according to this embodiment, in which the cycle voltammogram shows that a typical rectangular shape of an electric double layer is maintained up to 30 mV/s, the specific capacitance obtained at 5 mV/s is 123.6 F/g with respect to the half-cell, and equivalent series resistance (ESR) obtained under measurement of AC-impedance is 2.21 $\Omega cm^2$.

EXAMPLE 9

The current collector 13 is made of nickel foil, and the active material 150 is formed on the current collector 130 by the hydrothermal evaporation deposition method and the flash reduction method of <Example 6>. This is for comparison to select the active material 150 suitable for the current collector 130. FIGS. 9A to 9D show results from applying a triode test to the capacitor device 100 put into a beaker filled with 6M KOH. Referring to FIGS. 9A to 9D, the cycle voltammogram shows that a typical rectangular shape of an electric double layer is maintained up to 100 mV/s, the specific capacitance obtained at 5 mV/s is 102 F/g with respect to the half-cell, equivalent series resistance (ESR) obtained under measurement of AC-impedance is 0.24 $\Omega cm^2$, and a time constant is 1.27 sec.

EXAMPLE 10

In this example, a solution where 95 wt % graphene powder (Sky spring nanomaterials, Inc.), 2.5 wt % styrene butadiene rubber (SBR) used as a binder, and 2.5 wt % carboxymethyl cellulose (CMC) used as viscosity agent are mixed is deposited on the current collector 130 of the nickel foil through the hydrothermal evaporation deposition method, thereby forming the active material 150. FIGS. 10A to 10D show results from applying a triode test to the capacitor device 100 put into a beaker filled with 6M KOH. Referring to FIGS. 10A to 10D, the cycle voltammogram shows that a typical rectangular shape of an electric double layer is maintained up to 500 mV/s, the specific capacitance obtained at 5 mV/s is 57.5 F/g with respect to the half-cell, equivalent series resistance (ESR) obtained under measurement of AC-impedance is 0.6 $\Omega cm^2$, and a time constant is 0.32 sec. Although the specific capacitance is lower than those measured using the reduced graphene oxide as the active material, the binding property improved using the binder causes the time constant to be lowered from several seconds into 0.32 sec.

EXAMPLE 11

In this example, a solution where 95 wt % graphene powder (Skyspring nanomaterials, Inc.), 5.0 wt % polystyrene used as a binder are mixed is deposited on the current collector 130 of the nickel foil through the hydrothermal evaporation deposition method. FIGS. 11A to 11D show results from applying a triode test to the prepared capacitor device 100 put into a beaker filled with 6M KOH. Referring to FIGS. 11A to 11D, the cycle voltammogram shows that a typical rectangular shape of an electric double layer is maintained up to 500 mV/s, the specific capacitance obtained at 5 mV/s is 55 F/g with respect to the half-cell, equivalent series resistance (ESR) obtained under measurement of AC-impedance is 0.21 $\Omega cm^2$, and a time constant is 0.04 sec. Although the specific capacitance is lower than those measured using the reduced graphene oxide as the active material, the binding property improved using the binder causes the time constant to be lowered from several seconds into 0.32 second. Although the specific capacitance is lower than those measured using the reduced graphene oxide as the active material, the binding property improved using the binder causes the time constant to be lowered from several seconds into 0.05 sec which is shorter than that of when the SBR is used as the binder.

EXAMPLE 12

FIGS. 1A and 1B are views of schematically showing a manufacturing process of the capacitor device 100 according to embodiments of the present invention. As described above, the PP film is selected as the base film 110, and the nickel current collector 130 is formed having a thickness of about 10 μm on the base film 110 by the electrolytic plating or electroless plating method. Then, the active material 150 added with the binder is deposited on the nickel current collector. Two base films 110 equally manufactured for assembling the capacitor device 100 and used as the electrodes are prepared, and a film including the PP film is added as a reinforcing material 193 for an external package. To adhere the base film 110 and the reinforcing material 193 prepared for the external package, a hot-melt adhesive film 191 is used. The hot-melt adhesive film 191 includes a plastic paraffin film (i.e. parafilm) or an olefin film (i.e. a polyolefin film). For adhering each lead line portion, an auxiliary hot-melt adhesive 191a is provided so that both the prepared electrodes and the separator 170 can be overlapped and then thermally adhered, thereby completing the capacitor device 100. The electrode of the finally completed capacitor device 100 has an area of 4 cm$^2$ (2 cm×2 cm) and a thickness of about 450 µm. 6M KOH functioning as the electrolyte is injected into the capacitor device 100, and vacuum-impregnated for about 30 minutes so that an electrolyte can be well-infiltrated into the active materials. In this example, the active material 150 is achieved by mixing 95 wt % graphene powder and 5 wt % polystyrene used as a binder.

The adhesive used for bonding a device may include one of acrylate, silicone, epoxy and hot-melt adhesive.

FIGS. 12A to 12D show the electrochemical characteristics of the capacitor device 100 according to an embodiment of the present invention. Referring to FIGS. 12A to 12D, the cycle voltammogram shows that a typical rectangular shape of an electric double layer is maintained up to 200 mV/s, the specific capacitance obtained at 5 mV/s is 8 F/g with respect to a full-cell, equivalent series resistance (ESR) obtained under measurement of AC-impedance is 0.5 Ωcm$^2$, and a time constant is 0.04 sec. If the specific capacitance for the full-cell is converted into that for the half-cell, it is 32 F/g which is lower than those shown in the half-electrode test. However, the time constant is 0.04 sec which is not significantly different from those shown in the half-electrode test.

The adhering method for forming the device may selectively include one or a plurality of method among an adhering method using adhesive, a thermal adhering method, a thermal fusing method, and other welding methods.

In this example, the parafilm and the polyolefin film are both used for thermal adhesion, so that the PP films can be thermally fused and adhered.

Here, the adhering method may have to stably contain any kind of electrolytes. For example, in the case of a lithium cell using an organic electrolyte, if an aluminum pouch is used for the assembly, there is no difficulty in adhesion since it is not highly corrosive. However, if a highly corrosive electrolyte is used like 6M KOH of the present example, there is little way to stably contain the electrolyte. According to an embodiment of the present invention, a highly hydrophobic paraffin film is primarily thermal-adhered to tightly prevent leakage of the internal electrolyte, and the polyolefin film is secondarily thermal-adhered so that the adhesion between the base film 110 and the current collector 130 can be maintained, thereby stably sealing up the highly corrosive electrolyte.

This method may be applied to not only the capacitor device but also a case for containing acid and/or base.

On the other hand, the electrolyte applicable to the present invention may include an aqueous or non-aqueous (organic or ionic liquid) electrolyte, and the electrolyte may be provided in liquid, gel or solid state, etc.

Further, the separator applicable to the present invention may include polyethylene and polypropylene series, non-woven fabric, and a separator integrated with the electrolyte.

EXAMPLE 13

FIGS. 13A to 13D show the electrochemical characteristics of the capacitor device 100, and the used active material 150 includes 95 wt % graphene powder and 5 wt % polytetrafluoroethylene (PTFE) used as a binder. Referring to FIGS. 13A to 13D, the cycle voltammogram shows that a typical rectangular shape of an electric double layer is maintained up to 200 mV/s, the specific capacitance obtained at 5 mV/s is 11 F/g with respect to the full-cell, which is converted into that for the half-cell, i.e. 44 F/g, equivalent series resistance (ESR) obtained under measurement of AC-impedance is 0.47 Ωcm$^2$, and a time constant is 0.04 sec. The capacitor device 100 in this example has a specific capacitance increased a little, but has generally similar performance, and nearly the same time constant as compared with those of the device using the polystyrene binder.

Thus, according to an embodiment of the present invention, there are provided a method of manufacturing a flexible thin-film type super-capacitor device, which is very thin to have flexibility while maintaining high electrical conductivity and high binding property, and a super-capacitor device manufactured by the same, which includes simpler processes consuming less energy without an electrochemical etching process and shortens heating time in a hydrocarbon atmosphere.

EXAMPLE 14

In this example, sealing materials 400 and 500, which can effectively contain a material accommodated therein such as a highly corrosive material of acidity or alkalinity as well as an electrolyte, will be described in detail with reference to FIG. 14A to FIG. 16C.

First, as shown in FIGS. 14A and 14B, the sealing material 400 according to an embodiment of the present invention includes a sealing portion 493a which is a region to form a space for accommodating a material (refer to '480' of FIGS. 14A and 14B) therein and contain and seal up the accommodated material; a hot-melt adhesive 491 coupled to the sealing portion 493a; and a sealing means (not shown) for sealing up the sealing portion 493a in the state that the hot-melt adhesive 491 is coupled to the sealing portion 493a. The material of hot-melt adhesive 491 may include paraffin, polyolefin, or ethylene vinyl acetate (EVA).

For convenience of description, if the sealing material 400 of FIGS. 14A and 14B is used for the foregoing capacitor device, a reference numeral of '470' indicates a separation membrane, a reference numeral of '450' indicates an active material, a reference numeral of '430' indicates a material such as nickel foil or plating to be formed on the surface of the active material 450, a reference numeral '433' indicates a current collector including an electrode exposed from the material to the outside of the sealing material 400, a reference numeral of '491a' indicates an auxiliary adhesive interposed between and adhering the current collectors 433, a reference numeral of '493' indicates a base portion for forming the sealing portion 493a at an edge thereof, and a reference numeral of '480' indicates an accommodated material like an electrolyte.

In the foregoing example, paraffin, polyolefin or ethylene vinyl acetate (EVA) used for the hot-melt adhesive 491 is provided in the form of a film, but not limited thereto. Alternatively, paraffin, polyolefin or ethylene vinyl acetate (EVA) may be provided in the form of liquid or the like various shapes to phases as well as the film.

Further, as a way to seal up the hot-melt adhesive 491, the sealing means may use one or a plurality of methods among a simple pressing method, an adhesive adhesion method of applying an adhesive between the hot-melt adhesives 491, a thermal adhesion or fusion method of heating before the hot-melt adhesive 491 is deformed or heating until the hot-melt adhesive 491 is deformed a little, and a welding method of applying ultraviolet rays, infrared rays, heat or the like.

FIG. 15 is a table showing experimental results from testing suitability of a sealed portion when the accommodated material to be contained was 'KOH' with regard to various hot-melt adhesives 491 used by the sealing means based on the thermal fusion method. In FIG. 15, when paraffin, polyolefin, or ethylene vinyl acetate (EVA) is used as the hot-melt adhesive 491 for the sealing portion 493a, it is most suitable for 'KOH'.

On the other hand, in the sealing material 500 according to another embodiment of the present invention as shown in FIG. 16A to 16C, a hot-melt adhesive 591 may be used not only in the capacitor device but also being coupled to the sealing portion 593a simply accommodating a material (refer to the 'accommodated material' of FIGS. 16B and 16C). Even in this case, the sealing means may use one or a plurality of methods among a simple pressing method, an adhesive adhesion method, a thermal adhesion or fusion method, and a welding method as a way to seal up a hot-melt adhesive 591. Hereinafter, like numerals refer to like elements, and thus repetitive descriptions thereof will be avoided.

This embodiment may be not only applicable to the foregoing capacitor device but also applicable for containing and sealing up various materials accommodated therein.

In the related art, various sizes of dry cell such as a typical AA-type dry cell are only a way to contain 'KOH' used as the electrolyte. Therefore, it was impossible to use 'KOH' to the capacitor device shaped like a thin plate. That is, the related art did not take the foregoing hot-melt adhesive into account.

However, the conventional problems are solved by the sealing material 400, 500 according to the present invention as shown in various attached graphs and tables. Accordingly, the electrolyte excellent in efficiency can be stably and effectively contained within a space shaped like a thin film.

EXAMPLE 15

FIG. 17A shows a sealing material 600 according to another embodiment of the present invention, in which a hot-melt adhesive 691 is applied to only a sealing portion 693a4 among the sealing portions 693a1 to 693a4 of the base film 693, and the other sealing portions 693a1, 693a2 and 693a3 of the base film 693 are adhered by an adhesive means to one another, thereby accommodating an accommodated material (not shown) therein. As described above, the adhesive means may be one or a plurality of methods among the hot-melt adhesive or fusion method of applying heat for adhesion, and a welding method of applying ultraviolet rays, infrared rays, heat or the like.

Still another embodiment of a sealing material 700 according to the present invention is illustrated in FIG. 17B, in which a sealing portion 793a1 is not positioned at an outer edge but arranged a certain width (refer to a1 of FIG. 17B) inside a certain width (see a2 of FIG. 17B) from the outer edge.

That is, the sealing portion 793a1 is arranged inside the sealing material 700, and there is an area 793a2 where base members 793 outside the sealing portion 793a1 are adhered to and sealed up each other.

With these embodiments, it is possible to provide the sealing material 700 for accommodating the accommodated material through various methods.

According to an embodiment of the present invention, there are provided a sealing material, which is very thin to have flexibility while maintaining high electrical conductivity and high binding property, a method of manufacturing a flexible thin-film type super-capacitor device using the same, which is economical and of which mass production is possible since its processes consume less energy, and a super-capacitor device manufactured by the method.

In addition, there are provided a sealing material which can effectively and stably contain a material accommodated therein, a method of manufacturing a flexible thin-film type super-capacitor device using the same, and a super-capacitor device manufactured by the method.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A sealing material comprising:
   base members which comprise scaling portions for forming a space to accommodate a material therein and containing and sealing up the accommodated material;
   a hot-melt adhesive which is coupled to one of the sealing portions; and
   a sealing means which seals up the sealing portion in a state that the hot-melt adhesive is coupled to the sealing portion,
   wherein the material accommodated in the space includes electrolyte having potassium hydroxide (KOH),
   wherein the material of the hot-melt adhesive comprises paraffin that is primarily thermal-adhered to tightly prevent leakage of the electrolyte and polyolefin that is secondarily thermal-adhered so that adhesion between the base members can be maintained, and
   wherein the base members and the hot-melt adhesive are coupled with each other so that the sealing material has flexibility.

2. The sealing material according to claim 1, wherein the sealing means uses one of a press method, an adhesive adhesion method, a thermal adhesion method, a thermal fusion method and a welding method.

3. The sealing material according to claim 1, wherein the hot-melt adhesive is arranged inside a certain width from an outmost edge of the base members.

4. The sealing material according to claim 1, wherein the sealing material for sealing up the electrolyte is provided in a capacitor.

5. The sealing material according to claim 1, wherein the material of the hot-melt adhesive further includes ethylene vinyl acetate (EVA).

6. The sealing material according to claim 1, wherein the base members include a polyphenylene sulfide (PPS) film, a polypropylene (PP) film, a polyethylene phthalate (PET) film, a polycarbonate (PC) film, a polyethylene naphthalate (PEN) film, a polyethylene terephthalate (PET) film and a film on which metal comprising aluminum is deposited,
   wherein the base members further include an active material, and
   wherein the sealing material is used as a capacitor which comprises a current collector including an electrode electrically connected to the active material.

7. A sealing material comprising:
one base member and another base member each of which comprising sealing portions positioned at a certain width at outer edges of the one base member and the another base member, the sealing portions for forming a space to accommodate a material therein and containing and sealing up the accommodated material; and
a hot-melt adhesive which is coupled to one of the sealing portions so that the hot-melt adhesive is interposed between the one base member and the another base member,
wherein the material accommodated in the space includes electrolyte having potassium hydroxide (KOH), and
wherein the material of the hot-melt adhesive comprises either paraffin and polyolefin or paraffin and ethylene vinyl acetate (EVA).

* * * * *